United States Patent
Noda

(10) Patent No.: US 10,560,973 B2
(45) Date of Patent: Feb. 11, 2020

(54) TERMINAL DEVICE, TERMINAL DEVICE CONTROL METHOD, AND WIRELESS COMMUNICATION SYSTEM USING SAID TERMINAL DEVICE

(71) Applicant: Panasonic Intellectual Property Management Co., Ltd., Osaka (JP)

(72) Inventor: Masaaki Noda, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/075,899

(22) PCT Filed: Feb. 7, 2017

(86) PCT No.: PCT/JP2017/004305
§ 371 (c)(1),
(2) Date: Sep. 3, 2018

(87) PCT Pub. No.: WO2017/141759
PCT Pub. Date: Aug. 24, 2017

(65) Prior Publication Data
US 2019/0037615 A1    Jan. 31, 2019

(30) Foreign Application Priority Data

Feb. 18, 2016  (JP) ................................. 2016-028464
Feb. 18, 2016  (JP) ................................. 2016-028465

(51) Int. Cl.
*H04W 76/10*   (2018.01)
*H04W 52/02*   (2009.01)
(Continued)

(52) U.S. Cl.
CPC ............ *H04W 76/10* (2018.02); *G06F 1/263* (2013.01); *H04L 9/0819* (2013.01);
(Continued)

(58) Field of Classification Search
CPC ........... H04L 2012/2841; H04L 9/0819; H04L 67/025; H04L 67/12; H04L 12/2823;
(Continued)

(56) References Cited

U.S. PATENT DOCUMENTS

2011/0121654 A1* 5/2011 Recker .................... H02J 9/065
307/66
2013/0201316 A1* 8/2013 Binder .................... H04L 67/12
348/77
(Continued)

FOREIGN PATENT DOCUMENTS

WO        2015/068342        5/2015

OTHER PUBLICATIONS

International Search Report of PCT application No. PCT/JP2017/004305 dated Apr. 4, 2017.

*Primary Examiner* — Mewale A Ambaye
(74) *Attorney, Agent, or Firm* — McDermott Will & Emery LLP

(57) ABSTRACT

A terminal device is activated by causing an electric storage part to store power from a power generator, causing a voltage converter to convert a first voltage from the electric storage part into a second voltage, and supplying the second voltage to a control circuit. The terminal device includes a timer. The terminal device determines, according to registration data, which one of a normal mode signal and a pairing mode signal is transmitted by radio. The registration data is determined based on a time measured by the timer.

25 Claims, 27 Drawing Sheets

(51) Int. Cl.
*G06F 1/26* (2006.01)
*H04L 9/08* (2006.01)
*H04W 12/04* (2009.01)
*H04W 84/20* (2009.01)
*H04L 12/28* (2006.01)

(52) U.S. Cl.
CPC ....... *H04W 12/04* (2013.01); *H04W 52/0296* (2013.01); *H04W 84/20* (2013.01); *H04L 2012/2841* (2013.01)

(58) Field of Classification Search
CPC . H04W 12/04; H04W 52/0269; H04W 76/10; H04W 84/20
See application file for complete search history.

(56) References Cited

U.S. PATENT DOCUMENTS

| | | |
|---|---|---|
| 2016/0205706 A1 | 7/2016 | Noda |
| 2017/0293493 A1 | 10/2017 | Noda |
| 2018/0234009 A1* | 8/2018 | Cestero .................. A61B 90/50 |

* cited by examiner

TERMINAL DEVICE, TERMINAL DEVICE CONTROL METHOD, AND WIRELESS COMMUNICATION SYSTEM USING SAID TERMINAL DEVICE

This application is a U.S. national stage application of the PCT international application No. PCT/JP2017/004305 filed on Feb. 2, 2017, which claims the benefit of foreign priority of Japanese patent application Nos. 2016-028464 and 2016-028465 both filed on Feb. 18, 2016, the contents all of which are incorporated herein by reference.

TECHNICAL FIELD

The present invention relates to a terminal device that is used for various electronic apparatuses and is used to perform wireless communication with a master wireless device, a method of controlling the terminal device, and a wireless communication system that uses the terminal device.

BACKGROUND ART

In recent years, various electronic apparatuses, each of which is equipped with a wireless communication system, have found widespread application. The wireless communication system is configured with a master wireless device and a terminal device that performs wireless communication with the master wireless device. The master wireless device and the terminal device are caused to be paired with each other and are set to possibly perform wireless communication. Normally, the terminal device operates on a built-in battery. In recent years, development of small-sized light-weight power generation devices has been in progress as well, and the number of proposals for terminal devices, each of which has a built-in power generation device as a power generator, has increased as well. The applicant has proposed PTL 1.

A terminal device that is disclosed in PTL 1 has a built-in power generator and causes a control circuit to operate only with power from the power generator. That is, a voltage in accordance with power that is obtained from the power generator is supplied, as a power source voltage, to a control circuit, and thus the terminal device is activated. The terminal device is configured to switch between a normal mode that is normally used and a registration mode that is used when paired with a master wireless device, according to a time interval at which the terminal device is repeatedly activated multiple times. The terminal device transmits, by radio, a normal mode signal through the control circuit in the case of the normal mode, and transmits, by radio, a pairing mode signal for paring in the case of the registration mode.

In order to determine that the terminal device is switched to the registration mode, a determination circuit is connected to the control circuit in the terminal device. The determination circuit is configured with a time constant circuit including a resistor and a capacitor in such a manner that the voltage which is obtained from an output port of the control circuit is lowered according to a time constant. The voltage of the determination circuit, which is lowered, is read in an input port of the control circuit. The control circuit previously has a first reference value (a high voltage) and a second reference value (a lower voltage), and compares the first reference value and the second reference value against a voltage value from the determination circuit, which is read in the input port. The control circuit determines that the time interval of the activation of the terminal device is a short time in a case where the voltage value from the determination circuit is higher than the first reference value. The control unit determines that the time interval is a long time in a case where the voltage value is lower than the second reference value.

The terminal device is repeatedly activated multiple times. In a case where a plurality of results of the determination that are obtained with this activation is consistent with a predetermined pattern, the terminal device proceeds from the normal mode to the registration mode.

As described above, the terminal device determines the time interval at which the activation is performed multiple times, based on the voltage value from the time constant circuit, and transmits either a first signal or a second signal by radio in accordance with a mode that corresponds to the plurality of results of the determination.

CITATION LIST

Patent Literature

PTL 1: International Publication Pamphlet No. 2015/068342

SUMMARY

An object of the present invention is to provide a terminal device that is configured to select either a first signal or a second signal and to possibly transmit either the first signal or the second signal by radio without using the time constant circuit, a method of controlling the terminal device, and a wireless communication system that uses the terminal device.

In order to accomplish this object, a terminal device includes an activator, a power generator, an electric storage part, a voltage converter, a control circuit, and a wireless circuit. The power generator generates electric charge in response to operation of the activator. The electric storage part stores the electric charge. The voltage converter converts a first voltage obtained from the electric storage part into a second voltage. The control circuit includes a first input unit, a second input unit, an output unit, a nonvolatile memory, and a signal processing circuit. The control unit is operable to start operating from a first time with the second voltage as a power source that is applied to the first input unit. The control unit is operable to stop operating at a second time at which the second voltage falls below a lower limit voltage value. The wireless circuit transmits an output signal from the output unit by radio. The control circuit further includes an oscillator that generates a clock and a timer that measures of a clock speed during operation of the control circuit. When an m-th activation starts, the nonvolatile memory stores first to (m−1)-th pieces of registration data that are obtained while the activator is activated first to (m−1)-th times, respectively. When the output value exceeds a predetermined first threshold at a third time after the first time during the m-th activation, the control circuit stores, in the nonvolatile memory by the second time, the m-th registration data determined during the m-th activation based on a measurement time measured by the timer, and outputs either a first signal or a second signal as the output signal from the output unit according to the first to (m−1)-th pieces of registration data or according to the first to (m−1)-th pieces of registration data and the m-th registration data.

A terminal device includes a control circuit which includes a first input unit, a second input unit, an output unit, a nonvolatile memory, a signal processing circuit, and a timer. In a method of controlling the terminal device, the following processes. A second voltage as a power source voltage is applied to the first input unit from a first time by performing an m-th operation. The control circuit starts to operate by applying the power source voltage. The control circuit stops operating at a second time by causing the second voltage to fall below a lower limit voltage value. An output value of a voltage detector is input from the second input unit. The m-th registration data is determined according to a time measured by the timer after a third time at which the output value exceeds a first threshold that is predetermined. Either a first signal or a second signal is output as an output signal from the output unit according to first to (m−1)-th pieces of registration data or according to first to (m−1)-th pieces of registration data and m-th registration data which are stored in the nonvolatile memory.

A wireless communication system includes the terminal device described above and a master wireless device that receives a signal transmitted from the terminal device by radio. A first signal from the terminal device is a pairing mode signal through which the terminal device and the master wireless device are paired with each other.

As described above, the terminal device determines the m-th registration data based on the measurement time measured by the timer, and does this in the method of controlling the terminal device and the wireless communication that uses the terminal device. Either the first signal or the second signal is output as the output signal from the output unit according to the first to (m−1)-th pieces of registration data, or the first to (m−1)-th pieces of registration data and the m-th registration data. Accordingly, the terminal device selects the first signal or the second signal without using the time constant circuit, and possibly performs wireless transmission. More precisely, the selection or the like of the resistor and the capacitor that is used for the setting of the time constant and the time constant circuit, which are necessary for the terminal device is unnecessary. Furthermore, because the time measurement processing or the like in the timer is performed in so-called software processing, various settings are possibly provided flexibly only with a software change made in the terminal device, and thus an improvement in productivity is also achieved.

As described, according to the present invention, the terminal device can be configured to possibly transmit either the first signal or the second signal by radio without using the time constant circuit. It is possible that the terminal device which possibly provides various settings flexibly in a software and thus an improvement in productivity, the method of controlling the terminal device, and the wireless communication system that uses the terminal device are provided.

DETAIL DESCRIPTION OF PREFERRED EMBODIMENTS

Problems with terminal devices in the related art will be briefly described below before providing descriptions of embodiments of the present invention. The terminal device is activated with a limited amount of power from a built-in power generator, but consumes a large amount of power at the time of wireless transmission. Because of this, the time for which a control circuit possibly operates is limited. During this limited activation time, the control circuit compares a voltage value, which is obtained from a determination circuit, against a first reference value and a second reference value, and thus determines a time interval at which the terminal device is activated multiple times. However, in most cases, a desired time interval differs from one user to another. That is, time constants of the determination circuit have to be set to vary depending on the desired time interval. In this case, there is a need to manufacture a terminal device that reselects a resistance or a capacitor and resets the time constant taking into consideration a variation in power that is obtained from the power generator and a terminal device that is equipped with the determination circuit that has a different time constant. That is, a problem with the terminal device that is configured to have the termination circuit is that an improvement in productivity is difficult to accomplish. Furthermore, in the terminal device, when the determination circuit is configured on a circuit board that has a control circuit and the like, it is difficult to replace only the determination circuit. Thus, there is also a need to come up with an improvement measure.

A terminal device and a method of controlling the terminal device according to exemplary embodiments, and a wireless communication that uses the terminal device will be described below.

First Exemplary Embodiment (1. Relationship Between Terminal Device and Master Wireless Device)

Figure 1:
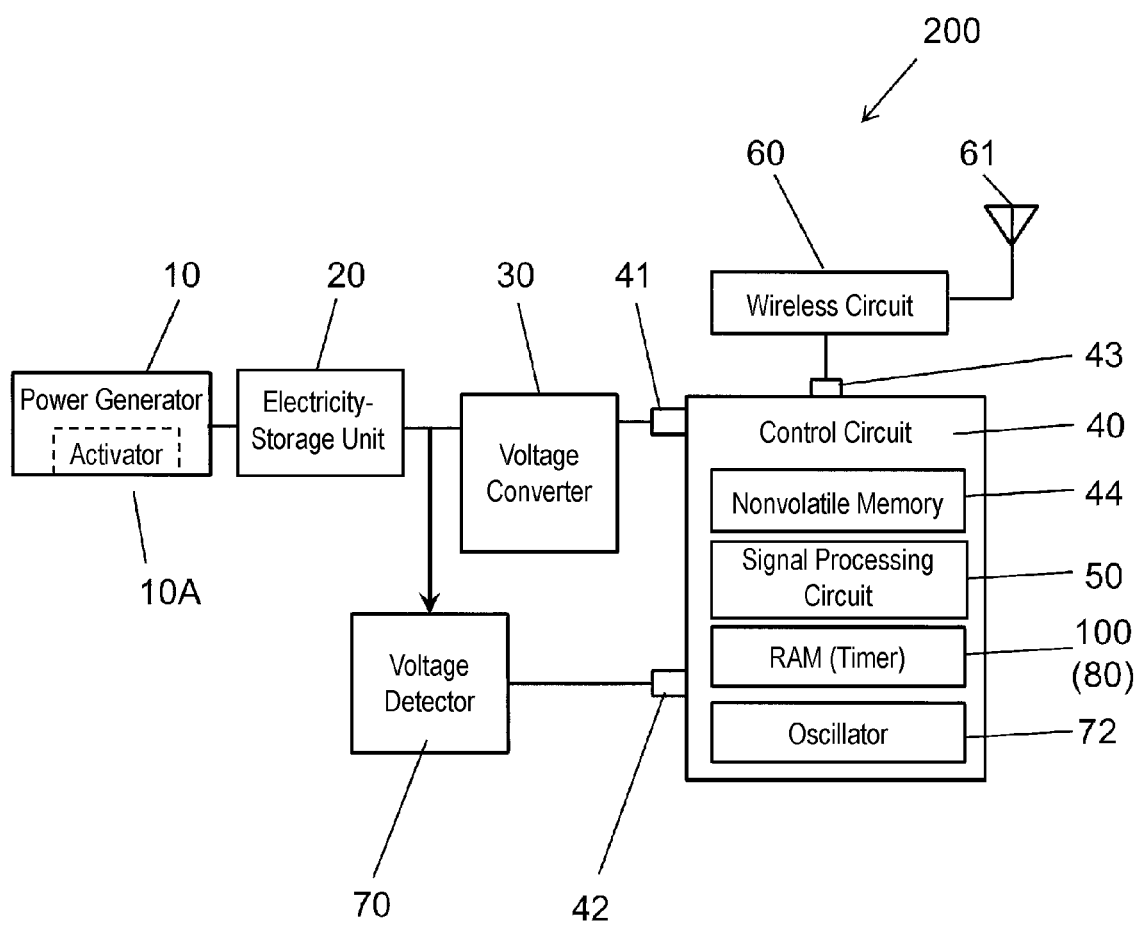
FIG. 1 is a block diagram illustrating an electrical configuration of a terminal device according to an embodiment of the present invention.
Figure 2:
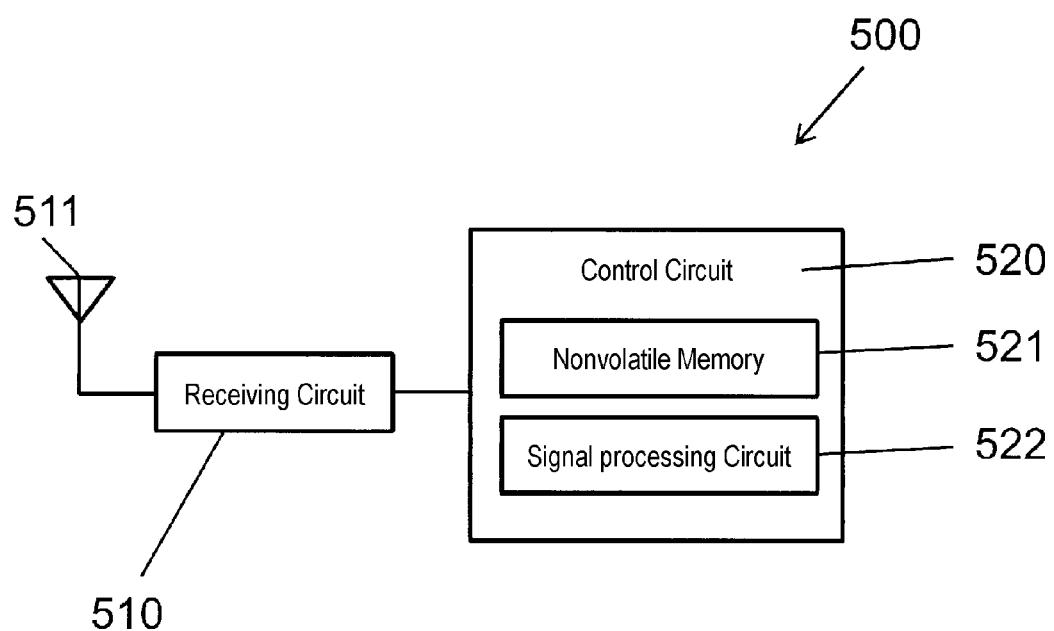
FIG. 2 is a block diagram illustrating an electrical configuration of a master wireless device according to the embodiment of the present invention.

FIG. 1 is a block diagram illustrating an electrical configuration of a terminal device according to an embodiment of the present invention. FIG. 2 is a block diagram illustrating an electrical configuration of a master wireless device.

Terminal device 200 illustrated in FIG. 1 is set for use such that possibly communicates with master wireless device 500 illustrated in FIG. 2 by radio. That is, terminal device 200 is paired for use with master wireless device 500. Terminal device 200, for example, is attached to a frame portion of a window or a door. Terminal device 200 is activated in response to an operation of opening or closing the window or the door, and transmits a predetermined wireless signal to wireless device 500. Regarding the wireless signal that is transmitted by terminal device 200, a pairing mode signal (hereinafter referred to as a first signal) is transmitted at the time of pairing with master wireless device 500, and a normal mode signal (hereinafter referred to as a second signal) in accordance with a normal usage state is transmitted after the pairing is completed and so forth. At least the second signal includes information on opening and closing of the window.

Master wireless device 500 is installed in a location away from terminal device 200. Master wireless device 500 is supplied with power from a commercial power source and operates at all times. The wireless signal from terminal device 200 is received in master wireless device 500, and master wireless device 500 performs prescribed control in accordance with the received signal.

(2. Electrical Configuration of Terminal Device)

A configuration of terminal device 200 will be described below with reference to FIG. 1. As is illustrated in FIG. 1, terminal device 200 includes power generator 10, electric storage part 20, voltage converter 30, control circuit 40, wireless circuit 60, and voltage detector 70.

Power generation unit 10 has a power generation mechanism that generates electric power. The power generation mechanism is of an electromagnetic induction type or is of a piezoelectric generation type, and for example, includes activator 10A that operates in conjunction with an act of opening or closing the window or the door and a mechanism that generates predetermined power that is limited according to operation of the activator 10A. That is, power generator 10 is a so-called energy harvester, and generates an amount of electric charge, which is as large as a limited amount of power, to build up to such a degree that activator 10A operates. The power generation mechanism may be of another type than an electromagnetic induction type and of a piezoelectric generation type.

Electric power generated in power generator 10 is stored in electric storage part 20 connected to power generator 10. Electric storage part 20 may include a rectifying circuit. Electric storage part 20 is connected to voltage converter 30. Voltage converter 30 converts a first voltage in accordance with the power stored up in electric storage part 20 into a second voltage. The first voltage and the second voltage are direct-current (DC) voltages.

Control circuit 40 includes first input unit 41, second input unit 42, output unit 43, nonvolatile memory 44, signal processing circuit 50, and oscillator 72 that generates a clock. Control circuit 40 further includes a random access memory (RAM) 100 that has timer 80 measuring a clock speed during operation of control circuit 40. If controlled by control circuit 40, RAM 100 having timer 80 may be attached from the outside. If controlled by control circuit 40, timer 80 other than that of RAM 100 may be used.

Voltage converter 30 is connected to first input unit 41 of control circuit 40. First input unit 41 is a power supplier. More precisely, voltage converter 30 is configured to apply the second voltage as a power source voltage to control circuit 40. Signal processing circuit 50 of control circuit 40 performs various processing operations. For example, various processing operations that are performed by signal processing circuit 50 include various numerical calculations or information processing operations, circuit control, and the like. Furthermore, signal processing circuit 50 outputs a predetermined output signal from output unit 43 and transmits the output signal by radio via wireless circuit 60. Wireless circuit 60 includes antenna 61.

Voltage detector 70 is connected between electric storage part 20 and voltage converter 30. In other words, voltage detector 70 can have the first voltage input thereto. Voltage detector 70 causes a predetermined output value in accordance with the first voltage to be input into second input unit 42. Voltage detector 70 may be implemented by, for example, a component such as a voltage detector integrated circuit (IC). Voltage detector 70 and voltage converter 30 may be integrated into one IC. Signal processing circuit 50 starts processing based on the output value.

(3. Electrical Configuration of Master Wireless Device)

A configuration of master wireless device 500 will be described with reference to FIG. 2. Master wireless device 500, as illustrated in FIG. 2, includes receiving circuit 510 including antenna 511, and control circuit 520. Control circuit 520 includes nonvolatile memory 521 and signal processing circuit 522. A power source voltage is supplied at all times from a commercial power source to master wireless device 500 via a power source circuit that is not illustrated.

Receiving circuit 510 is a circuit that receives a wireless signal from terminal device 200 via antenna 511. The received wireless signal is transferred to control circuit 520. Control circuit 520 causes signal processing circuit 522 to, e.g. make a determination of the wireless signal, and thus to perform corresponding processing. Master wireless device 500 is configured to possibly switch to a pairing mode when performing pairing with terminal device 200. An identifier or an encryption key of terminal device 200 is stored in nonvolatile memory 521. Signal processing circuit 522 decodes encrypted data extracted from the wireless signal received by receiving circuit 510, but a description of this is omitted.

(4. Processes for Pairing the Terminal Device and the Master Wireless Device)

Figure 3:
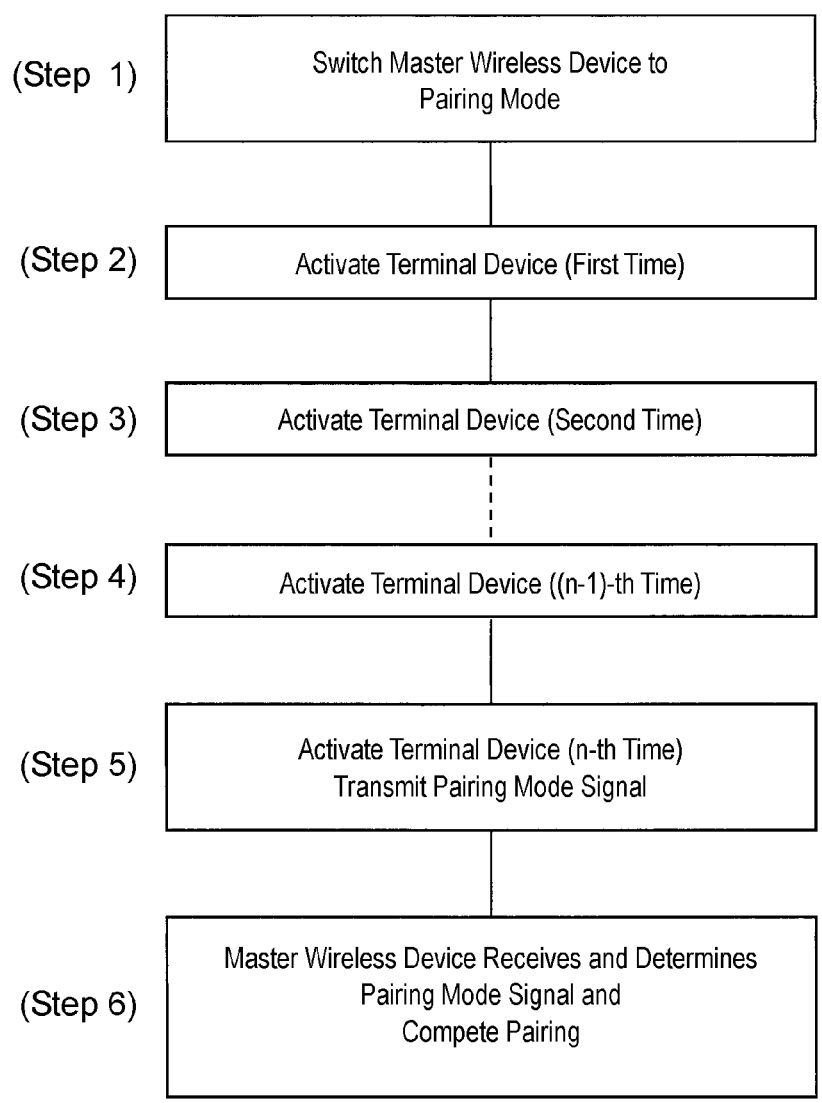
FIG. 3 is a flowchart for describing a flow when pairing between the terminal device and the master wireless device according to the embodiment of the present invention.

Next, a flow for pairing terminal device 200 with master wireless device 500 will be described with reference to FIG. 3. FIG. 3 is a flowchart for describing the processes for pairing the terminal device and the master wireless device.

An operator switches master wireless device 500 to the pairing mode in Step 1 illustrated in FIG. 3. The operator is a user who uses terminal device 200. Examples of the user include a contractor or the like that installs a window or the like. Thereafter, the operator, as illustrated in Steps 2 to 5 shown in FIG. 3, activates terminal device 200 repeatedly multiple times. That is, the operator repeatedly performs an act of opening a window in a closed state to which terminal device 200 is attached or closing the window in an opened state. Terminal device 200 is activated in each of Steps 2 to 4, and, while activated, makes a determination of registration data, a determination of a transmission signal that is based on registration data, or the like, which will be detailed below. Terminal device 200 transmits the second signal (the normal mode signal) in each of Steps 2 to 4. However, master wireless device 500 is not paired with terminal device 200 and thus ignores these second signals. In Step 5, when the operator activates terminal device 200 n times, in order to determine the transmission signal that is based on the registration data, control circuit 40 of terminal device 200 reads a predetermined pairing pattern and, for example, first to (n–1)-th pieces of registration data, from nonvolatile memory 44 and compares the first to (n–1) pieces of transmission data with the pairing pattern. In a case where the pairing pattern is consistent with a pattern that is read, terminal device 200 transmits the first signal (the pairing mode signal) by radio. After that, in Step 6, master wireless device 500 receives the first signal for determination. In a case where a condition is satisfied, master wireless device 500 sets terminal device 200 and completes the pairing.

(5. Change in Voltage During Activation of Terminal Device)

Figure 4:
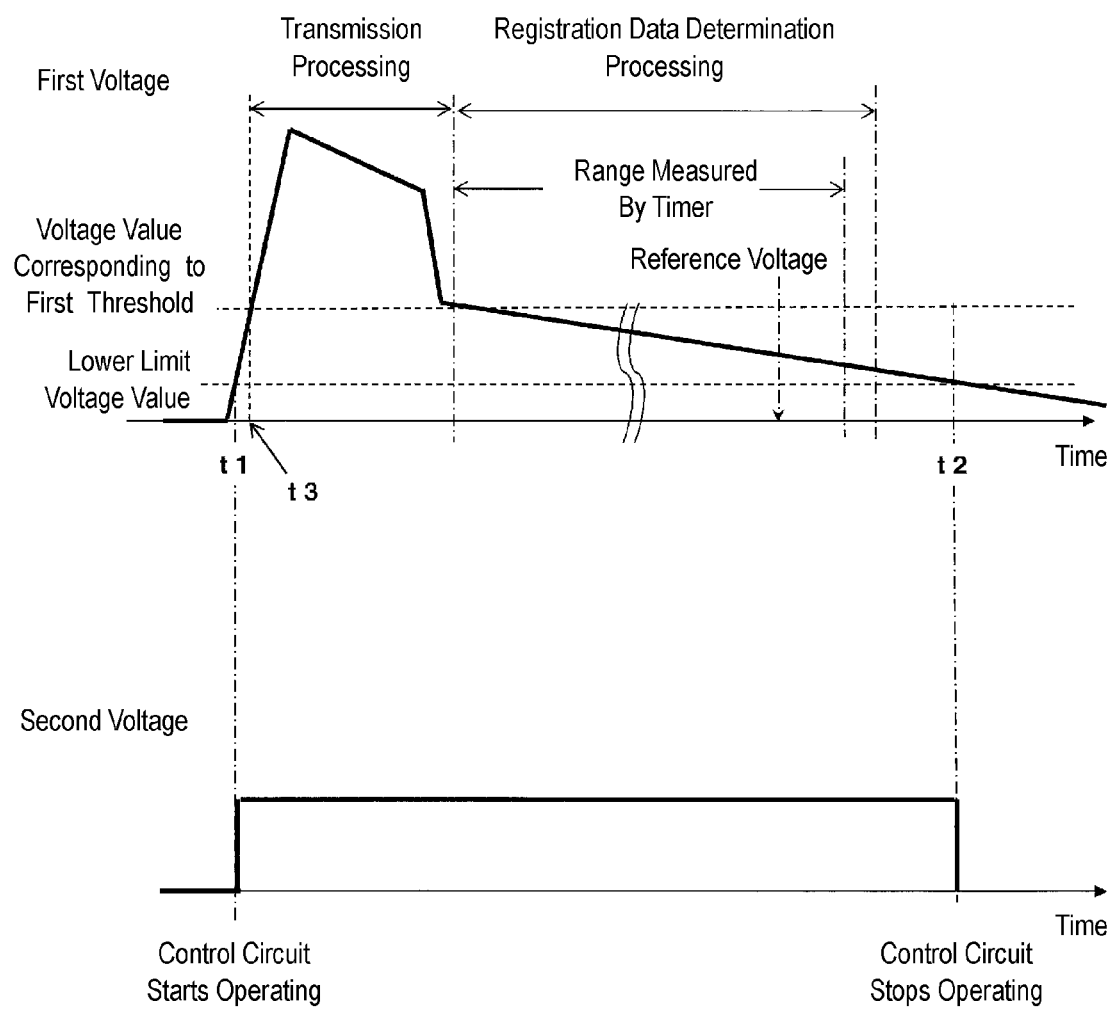
FIG. 4 is a diagram illustrating a change in a voltage during activation of the terminal device according to a first embodiment of the present invention.

Changes in the first voltage and the second voltage during the activation of terminal device 200 will be described below. Terminal device 200, while activated, performs a transmission processing and a registration data determination processing, which will be detail below. The change in the voltage differs in the order in which these processing operations are performed, but as an example, a case where the transmission processing is performed before the registration data determination is performed will be described below with reference to FIG. 4. FIG. 4 is a diagram illustrating a change in the voltage during the activation of the terminal device.

The operator performs an act for activating terminal device 200, and thus, power generator 10 built into terminal device 200 operates and generates electric power. The power generated by power generator 10 is stored in electric storage part 20. A value of the first voltage of electric storage part 20, as illustrated in FIG. 4, increases at a steep inclination over time. At first time t1, the value of the first voltage exceeds a lower limit voltage value at which control circuit 40 possibly operates. After first time t1, voltage converter 30 applies the constant second voltage to control circuit 40. The second voltage is a DC voltage.

Upon having the second voltage applied, control circuit 40 starts to operate and performs the transmission processing. The transmission processing includes a wireless transmission and thus needs a large amount of power. More precisely, much of the power stored in electric storage part 20 is consumed during the transmission processing. For this reason, the first voltage changes to have a peak value for the time when the transmission processing is in progress. After that, control circuit 40 performs the registration data determination processing. When performing the registration data determination processing, control circuit 40 also consumes power, but an amount of the consumed power is smaller than during the transmission processing. For this reason, after the transmission processing, the first voltage decreases gradually with the passage of time.

With the consumption of the power, the first voltage falls below the lower limit voltage value at second time t2. At a time point at which the first voltage falls below the lower limit voltage value, the supplying of the second voltage to control circuit 40 is stopped. Accordingly, control circuit 40 stops operating. Thus, terminal device 200 possibly operates for a duration from first time t1 to second time t2 with just a limited amount of power from power generator 10.

(6. Outline of Operation of Terminal Device)

Figure 5:
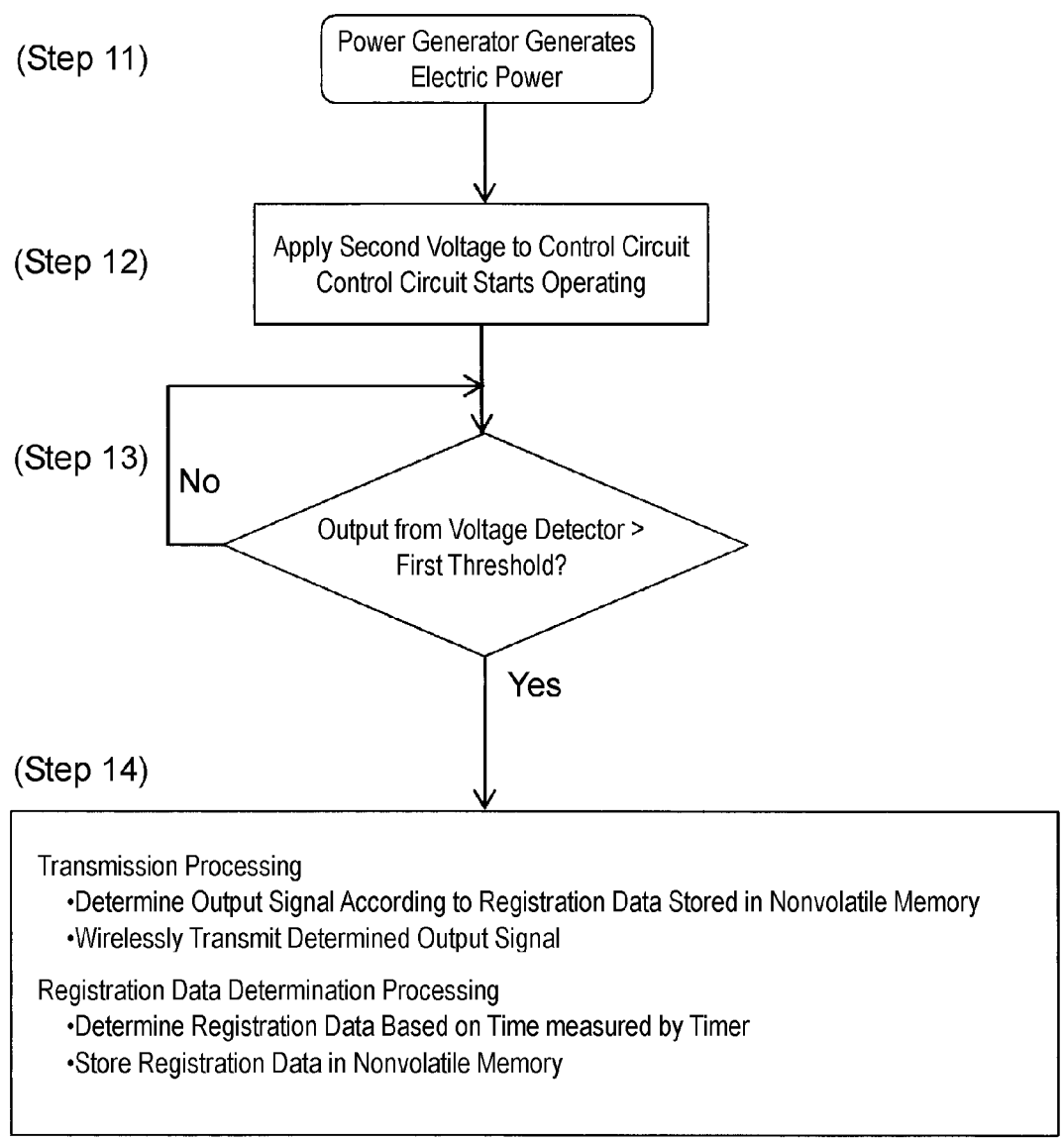
FIG. 5 is a flowchart illustrating an outline of operation of the terminal device according to the first embodiment of the present invention.

An outline of operation of terminal device 200 will be described below with reference to FIG. 5 as well as FIG. 4. FIG. 5 is a flowchart illustrating the outline of the operation of the terminal device.

The operator performs an act for activating terminal device 200. For example, the window or the like to which terminal device 200 is attached is opened and closed, and thus power generator 10 built into terminal device 200 to operate, resulting in activation of terminal device 200. That is, in terminal device 200, as illustrated Step 11 in FIG. 5, electric power is generated by power generator 10, and an amount of electric charge that is as large as a limited amount of power is stored in electric storage part 20. After that, in Step 12, the second voltage is applied to first input unit 41 of control circuit 40 at first time t1, and control circuit 40 starts to operate.

On the other hand, the first voltage is input at all times into voltage detector 70. Voltage detector 70 inputs the output value in accordance with the first voltage at all times into second input unit 42 of control circuit 40. Control circuit 40 has a first threshold to which the output value of voltage detector 70 is compared. After control circuit 40 starts to operate, in Sep 13, signal processing circuit 50 makes a comparison to determine whether or not the output value from voltage detector 70 exceeds the first threshold.

In a case where the output value from voltage detector 70 does not exceed the first threshold, Step 13 is repeated. In a case where the output value from voltage detector 70 exceeds the first threshold, processing by signal processing circuit 50 proceeds to Step 14.

In Step 14, signal processing circuit 50 performs the transmission processing and the registration data determination processing, which are described above.

In the transmission processing in Step 14, the output signal is determined according to registration data stored in nonvolatile memory 44. The determined output signal is transmitted by radio. In the registration data determination processing, the registration data is determined based on the time measured by timer 80. The registration data is stored in nonvolatile memory 44. The order of these two processing operations is not particularly limited.

(7. Registration Data Determination Processing of Terminal Device)

Figure 6:
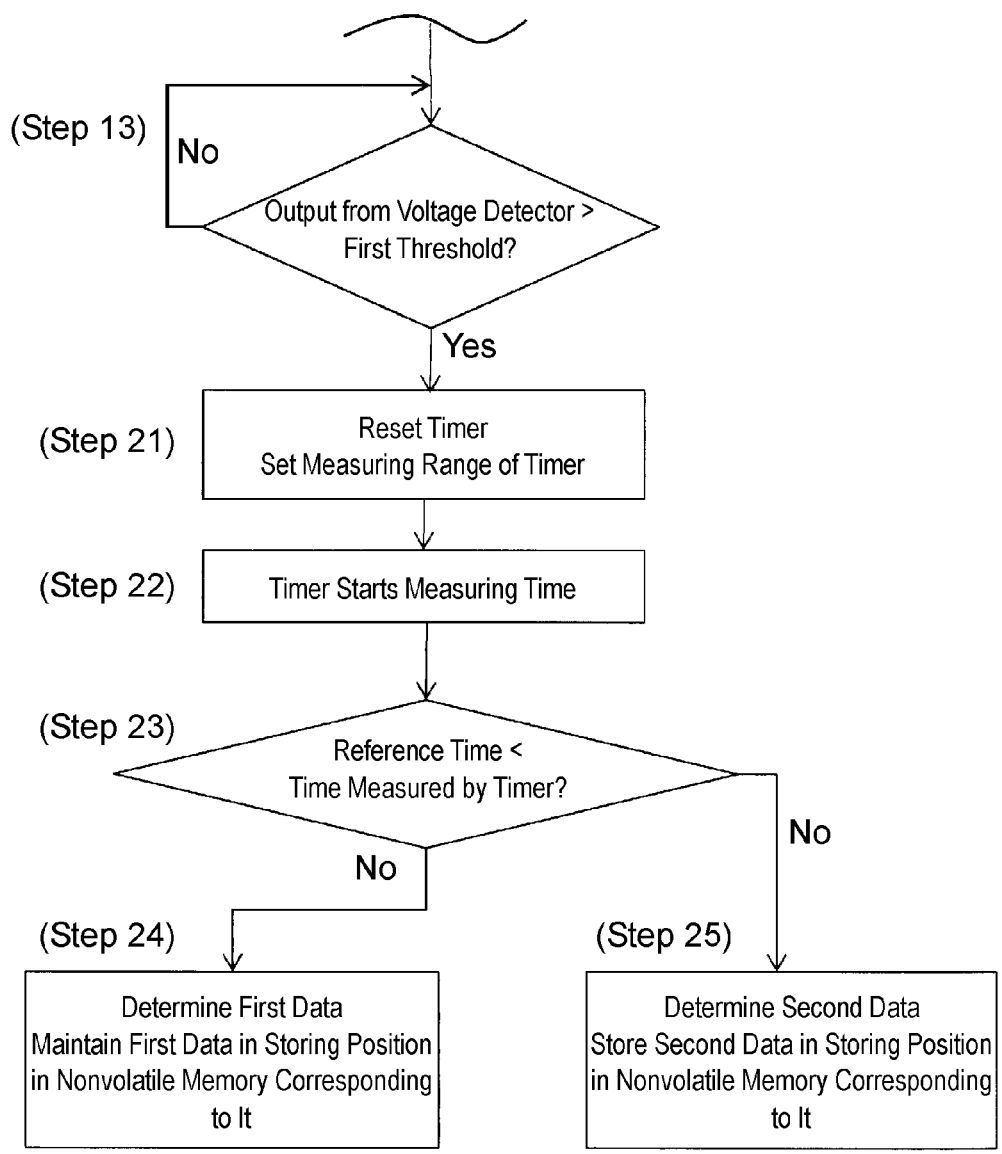
FIG. 6 is a flowchart illustrating a flow for a registration data determination processing in the terminal device according to the first embodiment of the present invention.
Figure 7:
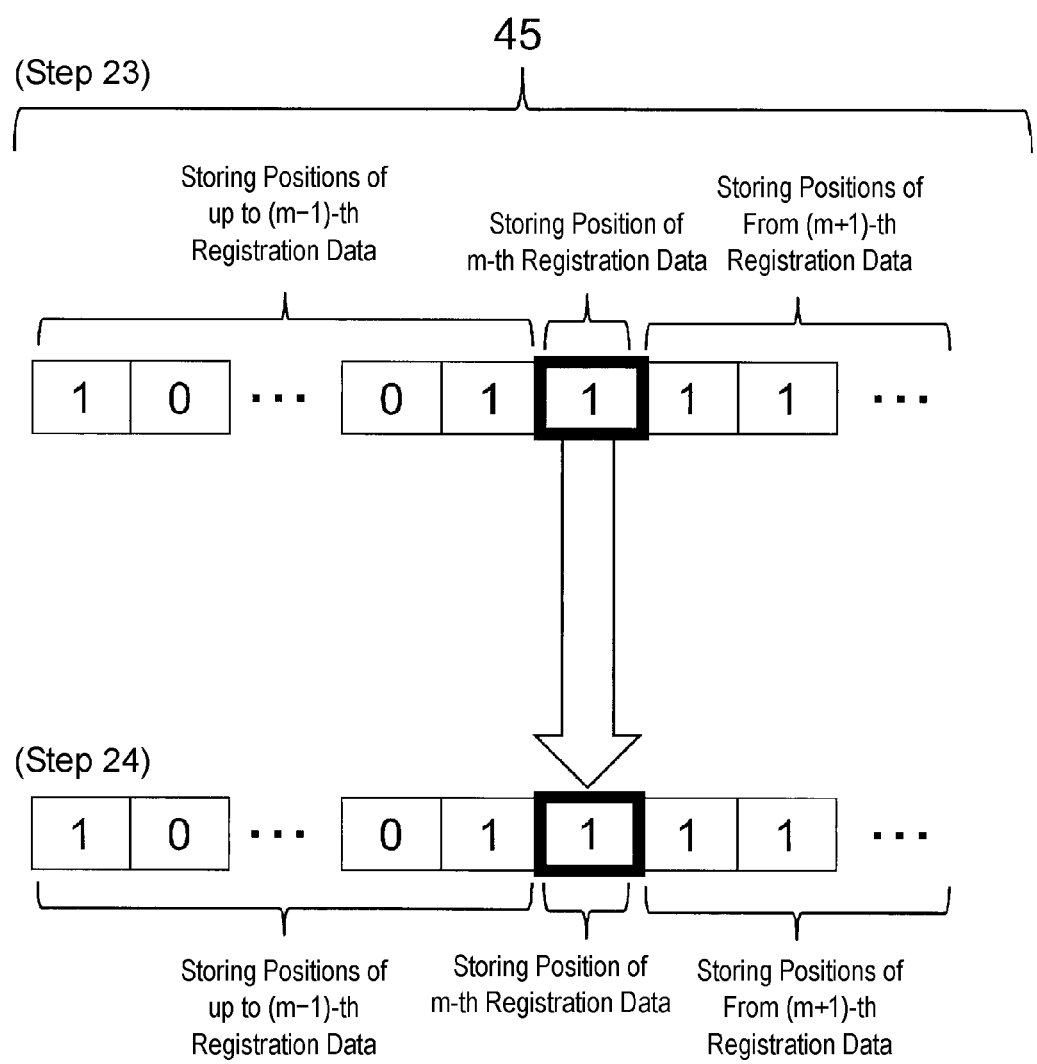
FIG. 7 is a diagram illustrating a flow for storing registration data in a nonvolatile memory in the terminal device according to the first embodiment of the present invention.
Figure 8:
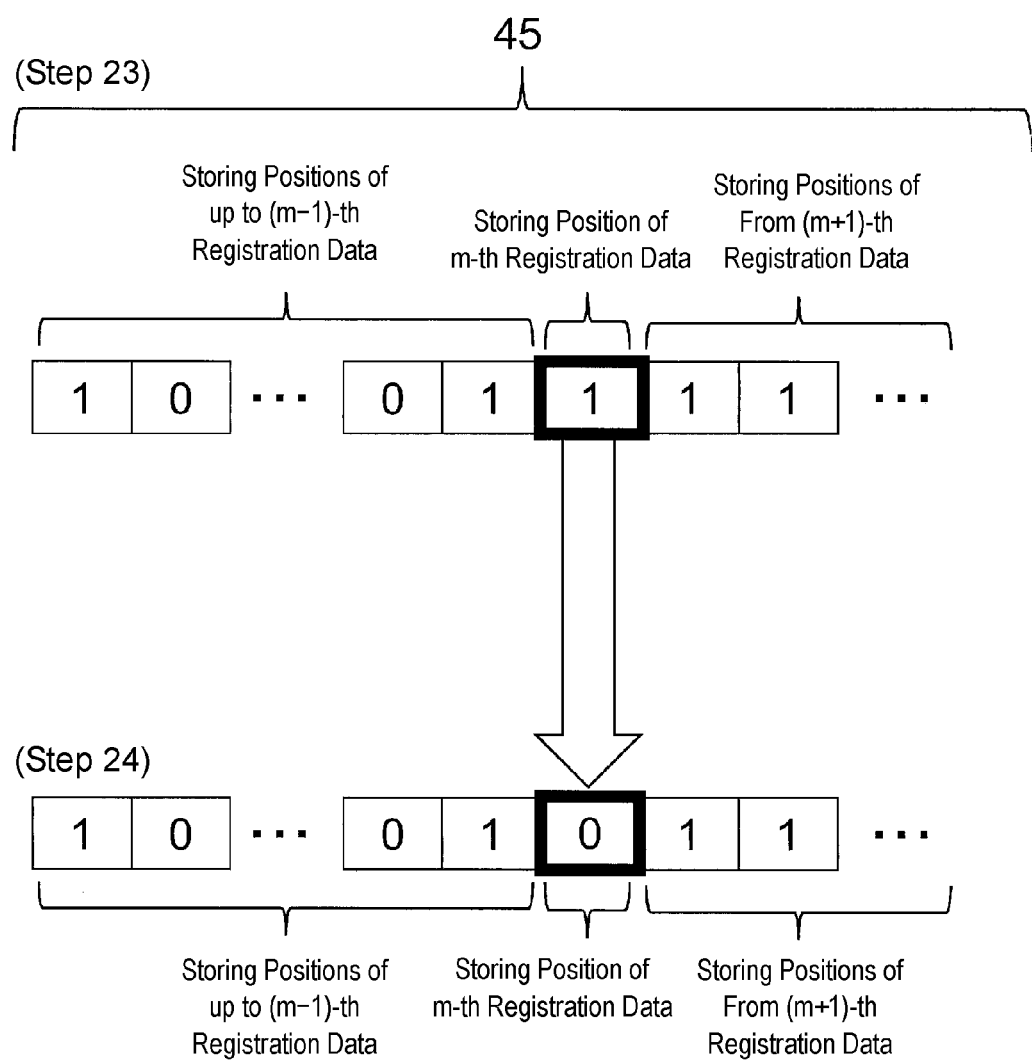
FIG. 8 is a diagram illustrating a flow for storing the registration data in the nonvolatile memory in the terminal device according to the first embodiment of the present invention.

The registration data determination processing in terminal device 200 will be described below with reference to FIGS. 6 to 8 as well as FIG. 4. FIG. 6 is a flowchart illustrating the registration data determination processing in the terminal device. FIG. 7 is a diagram illustrating a flow for storing the registration data in the nonvolatile memory in the terminal device. FIG. 8 is a diagram illustrating a flow for storing the registration data in the nonvolatile memory in the terminal device.

When terminal device 200 is activated, signal processing circuit 50, as described above, compares the output value from voltage detector 70 against the first threshold in Step 13 (FIG. 5). It is assumed that the output value from voltage detector 70 exceeds the first threshold at third time t3 and that, as illustrated in FIG. 6, the processing by signal processing circuit 50 proceeds to Step 21.

In Step 21, signal processing circuit 50 resets timer 80 of RAM 100. Furthermore, signal processing circuit 50, as illustrated in FIG. 4, sets a range of measurement in timer 80 for a duration from third time t3 to second time t2. A reference time is set to be within the range of measurement. An ending time at the end of the range of measurement is set to be earlier than second time t2. A duration from the reference time to the ending time is set so as to include a time during which the registration data is possibly stored in nonvolatile memory 44.

After that, in Step 22, signal processing circuit 50 causes timer 80 to start measuring time from a starting time that is the start of the range of measurement that is set. In Step 23, signal processing circuit 50 compares the time measured by timer 80 against the reference time. Based on this comparison, signal processing circuit 50 determines the registration data. In Step 24 or 25, the signal processing circuit 50 stores the determined registration data in nonvolatile memory 44.

A stored state of the registration data in nonvolatile memory 44 will be detailed below with reference to FIGS. 7 and 8.

Nonvolatile memory 44, as illustrated in FIGS. 7 and 8, includes plural storage positions in each of which the registration data determined each time terminal device 200 is activated is stored. In order to provide a description for easy understanding, these storage positions are collectively described below as storage area 45, and the term, storage area 45, is also used in FIGS. 7 and 8.

As is illustrated in FIGS. 7 and 8, storage areas 45 of nonvolatile memory 44 include storage positions for first to (m−1)-th pieces of registration data that are determined while terminal device 200 is activated first to (m−1)-th times, respectively, a storage position for m-th registration data that is determined while terminal device 200 is activated this time, that is, an m-th time, and storage positions for (m+1)-th and subsequent pieces of registration data that are determined while terminal device 200 is activated (m+1) time and subsequent times, respectively. The registration data indicating that a time is short is expressed as first data. The registration data indicating that a time is long is expressed as second data. In FIGS. 7 and 8, the first data and the second data are expressed as "1," and "0," respectively.

At a starting time point at which terminal device 200 is activated at an m-th time, as illustrated in the upper portion of FIG. 7 and in the upper portion of FIG. 8, the first to (m−1)-th pieces of registration data are stored in corresponding storage positions in storage area 45, respectively. The first data is previously stored in a storage position for m-th registration data and storage positions for the (m+1)-th and subsequent pieces of registration data. A timing at which the first data is stored in storage positions for the m-th and subsequent pieces of registration data is before Step 24 or 25.

The storage positions for the m-th and subsequent pieces of registration data within storage area 45 may be storage positions for pieces of registration data in the past that have been set not to be used as a result of the comparison against the pairing pattern that will be described below. In this case, similarly, the first data is also stored again previously in the storage position for the registration data in the past. Since the number of times that writing on nonvolatile memory 44 is limited, in order to alleviate this, plural storage areas 45 are preferably provided, plural storage areas 45 are used alternately used. Selection data to select is caused to be registered in nonvolatile memory 44, and storage area 45 to be used may be set to be determined based on the selection data.

In Step 23 illustrated in FIG. 6, signal processing circuit 50 compares the time measured by timer 80 at the time of m-th activation against the reference time. In a case where the time measured by timer 80 is shorter than the reference time, the processing by signal processing circuit 50 proceeds to Step 24 illustrated in FIG. 6 and determines the m-th registration data as the first data. That is, as illustrated in the lower portion of FIG. 7, a stored state of the first data is maintained in Step 24 while the first data is still stored previously in the storage position for the m-th registration data, in storage area 45.

Situational examples of a case where the time measured by timer 80 is shorter than the reference time include a case where, for example, during the time measurement in timer 80 and before the reference time is reached, the output value of voltage detector 70 falls below the first threshold and thus the (m+1)-th activation is performed in this state and power generator 10 operates again. In this case, the output value from voltage detector 70, which falls below the first threshold exceeds the first threshold again at a fourth time. In this case, a state can also be reached where, by performing the processing in Step 24, the first data that is determined as the m-th registration data when terminal device 200 starts to be activated at the (m+1)-th time is stored in a corresponding m-th storage position. Considering this, the reference time is preferably set to a time at which the output value from voltage detector 70 is lower than the first threshold.

In Step 23 illustrated in FIG. 6, in a case where the time measured by timer 80 exceeds the reference time, the processing by signal processing circuit 50 proceeds to Step 25 illustrated in FIG. 6, and determines the m-th registration data as the second data. In Step 25, signal processing circuit 50 stores again the second data in the storage position for the m-th registration data. That is, as illustrated in the lower portion of the FIG. 8, signal processing circuit 50 stores again the second data in the storage position in storage area 45 for the m-th registration data.

As described above, in terminal device 200, the time measured by timer 80 during the m-th activation is compared against the reference time, and the m-th registration data is determined. At the time of the (m+1)-the activation, a state can be reached where the determined m-th registration data is stored in the storage position for the m-th registration data, of nonvolatile memory 44. In other words, the determination and the storage of the m-th registration data are completed by second time t2 at which control circuit 40 stops, which is before the m-th activation is performed.

Thus, in terminal device 200, a length of the time during the activation is determined based on the time measured by timer 80, and a result of the determination is obtained. This configuration allows a time constant circuit to be unnecessary, and selection of a resistor and a capacitor that are used for setting of the time constant and the time constant circuit is unnecessary. Terminal device 200 that performs only software processing which uses timer 80, and thus, can provide various settings by changing software can be manufactured. This improves productivity. The case where timer 80 is used for time measurement processing is described above as an example, but instead of timer 80, a counter may be used that possibly measures the time in the software processing.

Since nonvolatile memory 44 is influenced by the limitation on the number of times of writing, plural storage areas 45 are preferably provided so as to alleviate this and that the plural storage areas 45 are used alternately. The selection data to select is registered in nonvolatile memory 44. Storage area 45 to use may be set to be determined based on the selection data.

In a case where the registration data determination processing is performed after the transmission processing, when timer 80 starts to operate, control circuit 40 decreases an operation clock frequency to a value lower than a value of the operation clock frequency that is used before timer 80 starts to operate, or control circuit 40 decreases the lower limit voltage value after timer 80 starts to operate, and thus, can cause an operating state of control circuit 40 to be maintained for a longer time, with a limited amount of power from power generator 10.

One reference time is described above, but two reference times may be set in a case where only a first reference time is exceeded and after that, in a case where a second reference time is exceeded, different pieces of registration data may be determined.

(8. Transmission Processing in Terminal Device)

Figure 9:
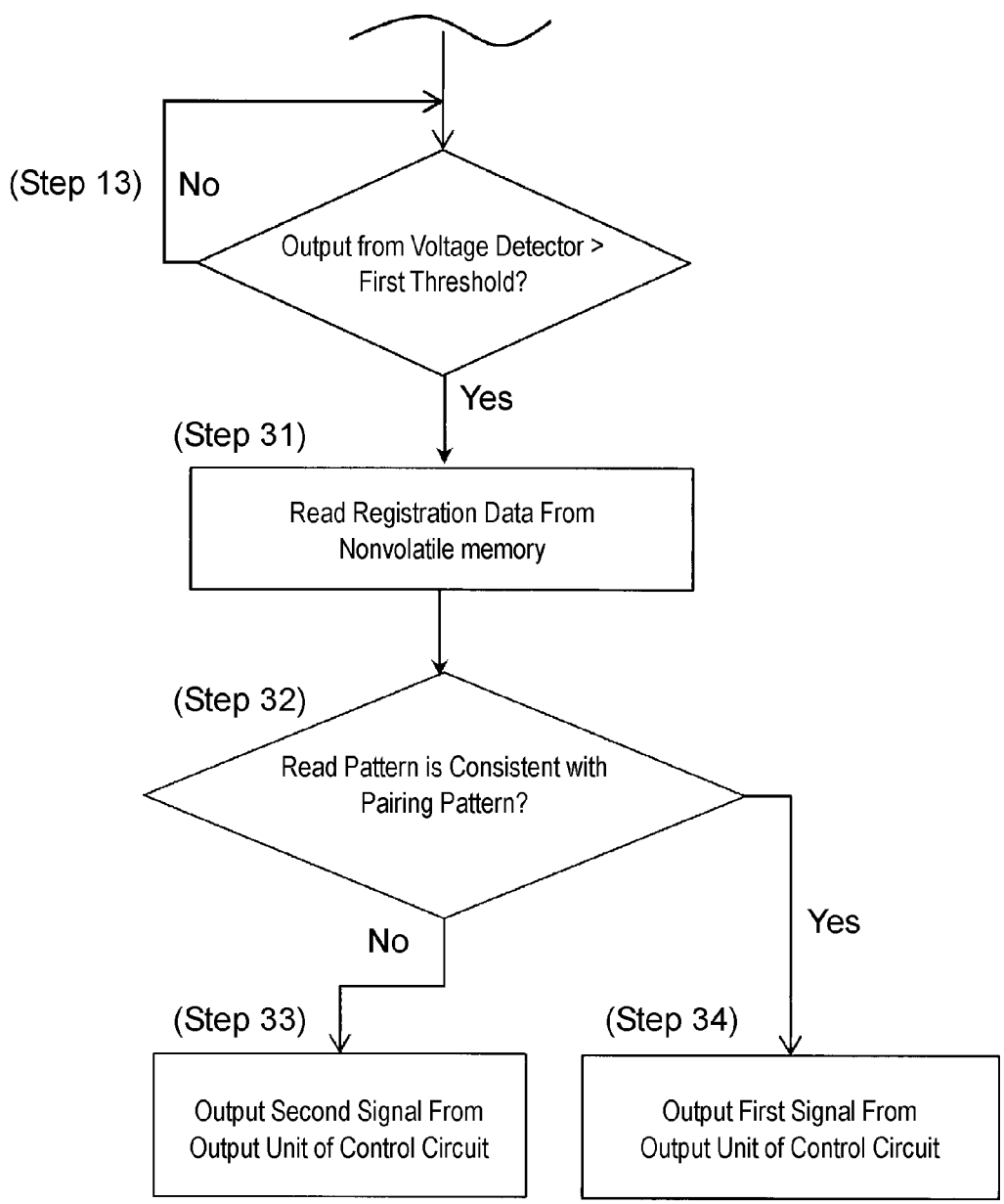
FIG. 9 is a flowchart illustrating a flow for an outline of transmission processing in the terminal device according to the first embodiment of the present invention.

The transmission processing in the terminal device will be described with reference to FIG. 9 as well as FIG. 3. FIG. 9 is a flowchart illustrating an outline of the transmission processing in the terminal device.

In Step 5 in FIG. 3, with an n-th act, the operator activates terminal device 200. In a case where terminal device 200 satisfies the condition in Step 13, which is described above and thus proceeds to Step 31, signal processing circuit 50 reads, from storage area 45, the registration data stored in nonvolatile memory 44 in Step 31. A reading range of the registration data will be described under the next section.

Subsequently, signal processing circuit 50 compares a reading pattern that is read in Step 32 to the pairing pattern that is previously determined. In a case where the reading pattern is not consistent with the pairing pattern, the processing by signal processing circuit 50 proceeds to Step 33, and signal processing circuit 50 generates the second signal from output unit 43, outputs the generated second signal, and transmits the generated second signal via wireless circuit 60 by radio.

In Step 32, in a case where the reading pattern is consistent with the pairing pattern, the processing by signal processing circuit 50 proceeds to Step 34, and signal processing circuit 50 generates the first signal that is the pairing mode signal from output unit 43, outputs the generated first signal, and transmits the generated first signal via wireless circuit 60 by radio.

(9-1. Reading Range of Registration Data in Case where Transmission Processing is Performed in Terminal Device Before Registration Data Determination Processing)

Figure 10:
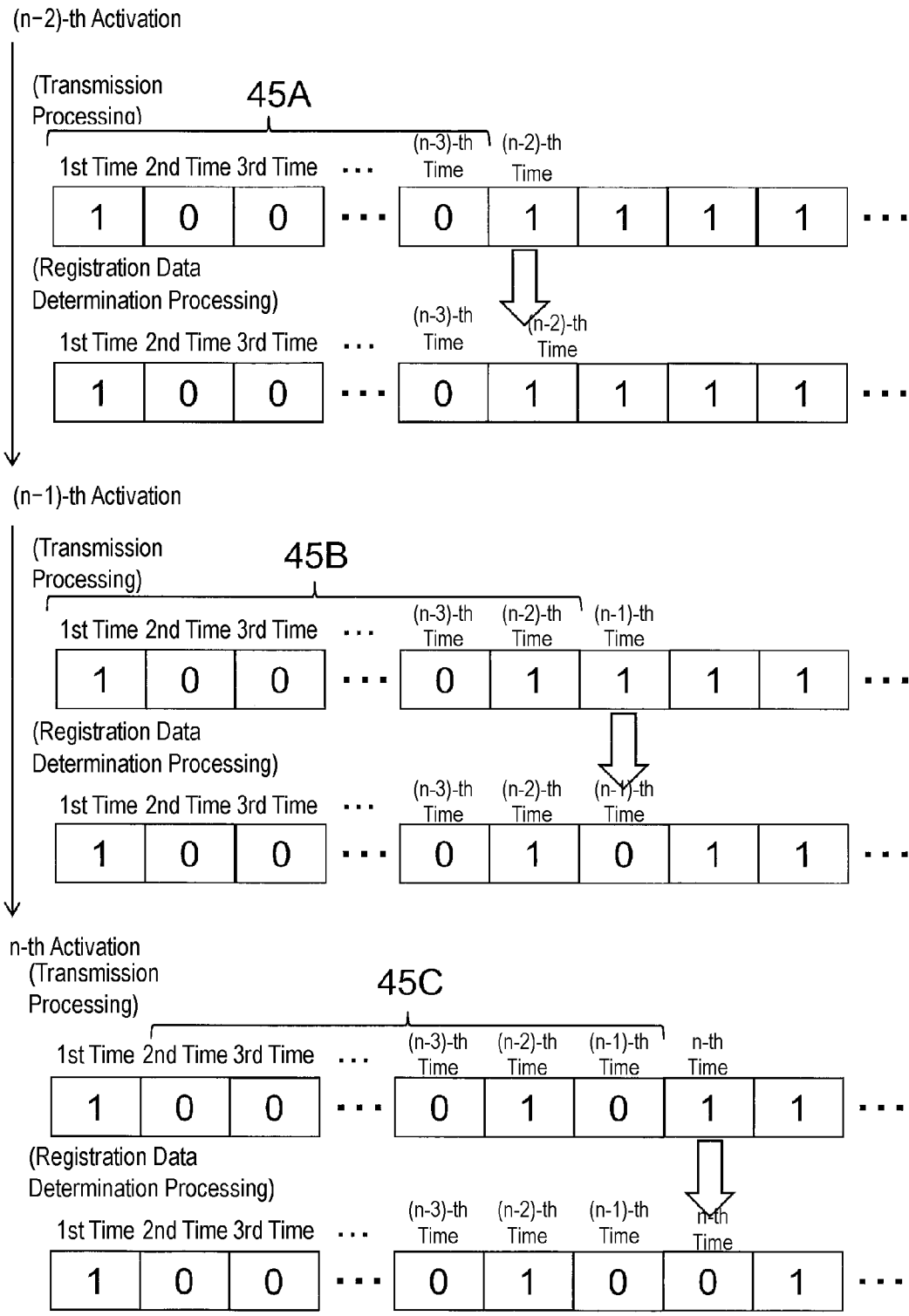
FIG. 10 is a diagram for describing a reading range of the registration data in the terminal device according to the first embodiment of the present invention.

Next, the range of the reading from storage area 45 in a case where terminal device 200 performs the transmission processing before the registration data determination processing will be described with reference to FIG. 10. FIG. 10 is a diagram for describing the reading range of the registration data in the terminal device. In order to provide a description for easy understanding, it is assumed that the pairing pattern is (n−2) number of pattern sequences. The registration data is the first data or the second data described above.

As illustrated in the upper portion of FIG. 10, at a time point at the (n−2)-th activation of terminal device 200, pieces of registration data from first registration data determined during the first activation to the (n−3)-th registration data determined during (n−3)-th activation are stored in corresponding storage positions in storage area 45. The first data, as described above, is temporarily stored in storage positions in storage area 45 for storing the (n−2)-th and subsequent pieces of registration data, respectively.

In this state, terminal device 200 performs the (n−2)-th transmission processing. First, signal processing circuit 50 conducts a backward-in-time search of pieces of registration data in the past, starting from the latest registration data toward the past, and reads the pieces of registration data in storage area 45. The maximum number of pieces of registration data is the same as the number of pairing patterns. More precisely, in the (n−2)-th transmission processing, storage positions for the (n−3)-th registration data, the (n−4)-th registration data, and so forth up to the second registration data, and the first registration data are set as reading range 45A, and pieces of registration data are sequentially read from these storage positions. During the (n−2)-th activation, the number of pieces of registration data that are read is (n−3) that is smaller by 1 than the number of pairing patterns. The reading pattern that is made up of the pieces of registration data which are read is compared against the pairing pattern. Since the number of reading patterns that are read at the time of the (n−2)-th activation is smaller than the number of pairing patterns, it is determined that there is a difference between the reading pattern and the pairing pattern, and signal processing circuit 50 makes a determination as the second signal (the normal mode signal) and transmits the generated second signal by radio. After, the (n−2)-th registration data is stored in the (n−2)-th storage position in storage area 45 during the (n−2)-th activation of terminal device 200. The (n−2)-th registration data is illustrated as being maintained as the first data as is.

Subsequently, in Step 4 shown in FIG. 3, when terminal device 200 is activated at the (n−1)-th time, as illustrated in the middle portion of FIG. 10, the registration data is read from storage area 45 as in the case of the (n−2)-th activation. Since the number of reading registration data is identical to the number of pairing patterns, in the (n−1)-th transmission processing, the storage positions for the (n−2)-th registration data, the (n−3)-th registration data, and so forth up to the second registration, and the first registration data are set as reading range 45B, and the pieces of registration data are sequentially read from these storage positions. After that, the reading pattern is compared against the pairing pattern, and a corresponding output signal is transmitted by radio. At this moment, it is assumed that it is determined that there is a difference between the reading pattern and the pairing pattern, and thus that the second signal is set to be transmitted. After that, (n−1)-th registration data is stored in an (n−1)-th storage position in storage area 45 during (n−1)-th activation of terminal device 200. It is illustrated that, as the (n−1)-th registration data, the second data is set to be stored over again.

Subsequently, in Step 5 shown in FIG. 3, when terminal device 200 is activated at the n-th time, as illustrated in the lower portion of FIG. 10, storage positions for the (n−1)-th registration data, the (n−2)-th registration data, and so forth up to the third registration data and the second registration data, the number of which is the same as the number of arranged pairing patterns, are set as reading range 45c, and pieces of registration data are sequentially read from these storage positions. It is assumed that the reading pattern that is made up of the pieces of registration data that are read is compared against the pairing pattern and that it is determined that both are consistent with each other. In this case, signal processing circuit 50 during the n-th activation of terminal device 200, makes a determination as the first signal (the pairing mode signal). The generated first signal is transmitted via antenna 61 by radio. Master wireless device 500 receives and determines the pairing mode signal. If a condition is satisfied, the pairing is completed. FIG. 10 illustrates that the registration data during the n-th activation is subsequently stored in an n-th storage position in storage area 45, but the storing of the n-th registration data may not be performed according to the completion of the pairing. Furthermore, in the n-th reading, the first registration data may not be used. The storage position for the first registration data corresponds to the above-described storage position for the registration data in the past.

The reading range for determining the pairing mode is not limited only to the setting described above. For example, a reference target may be determined previously within the storage position, and based on registration data in a predetermined storage position, which is set to be the reference target, the determination of the pairing mode may be made. For example, it is also possible that when one out of every two storage positions is set to be the reference target, only with an act of changing the window or the door from the opened state to the closed state, or only with an act of doing the reverse, the determination of the pairing mode is made based on the registration data that is obtained. In this case, two or more storage positions are preferably set to be reference targets.

(9-2. Reading Range of Registration in Case where Transmission Processing is Performed after Registration Data Determination Processing in Terminal Device)

Figure 11:
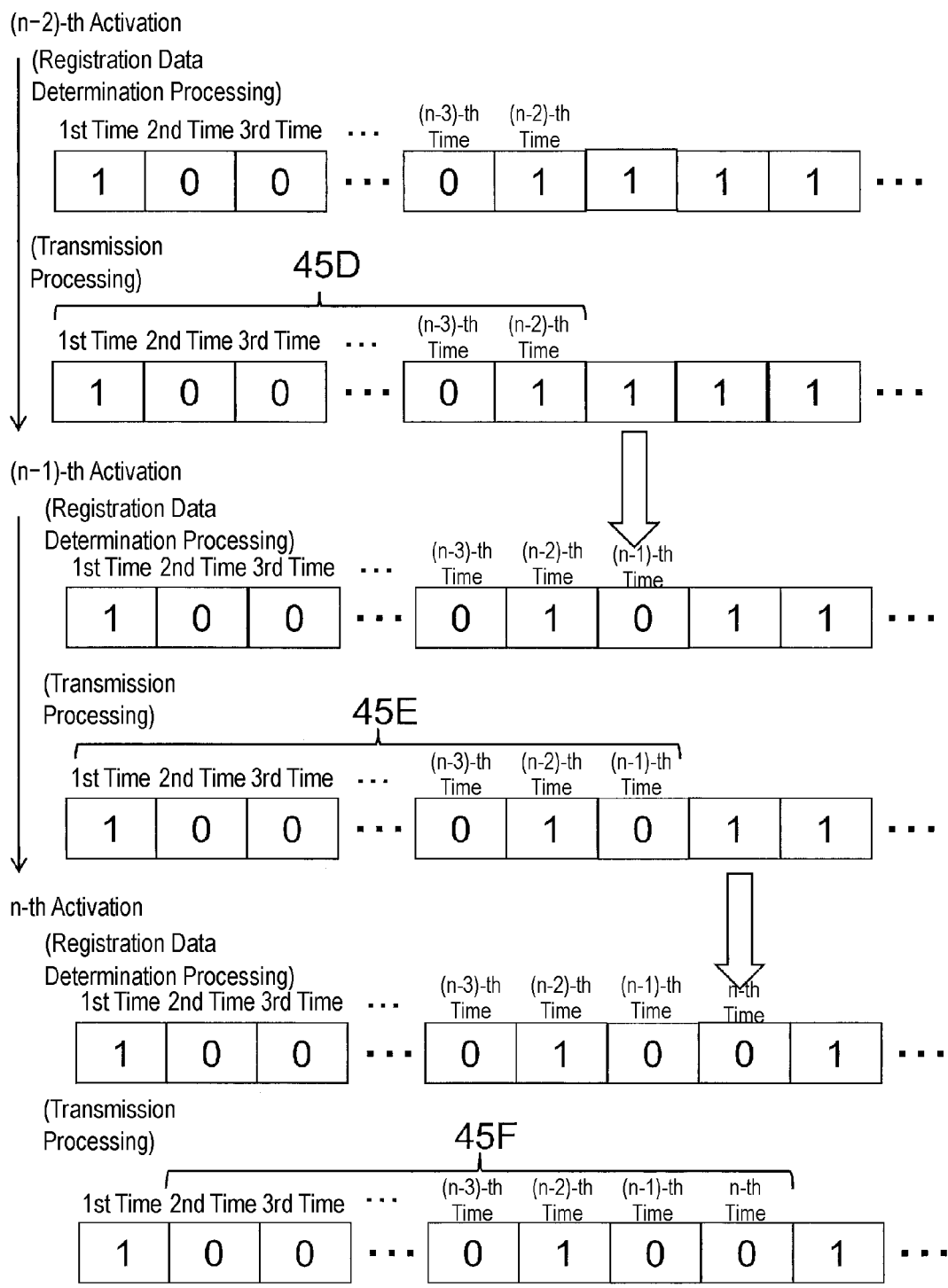
FIG. 11 is a diagram for describing the reading range of the registration data in the terminal device according to the first embodiment of the present invention.

Next, the range of the reading from storage area 45 in the case where terminal device 200 performs the transmission processing after the registration data determination processing will be described with reference to FIG. 11. FIG. 11 is a diagram for describing the reading range of the registration data in the terminal device. To provide a description for easy understanding, it is assumed that the pairing pattern is (n−1) number of pattern sequences. The registration data is the first data or the second data, as described above.

Terminal device 200 performs the (n−2)-th registration data determination processing, and then performs the (n−2)-th transmission processing. More precisely, as illustrated in the upper portion of FIG. 11, the first registration data determined during the first activation to the (n−2)-th registration data determined during the (n−2)-th activation are stored in storage positions of storage area 45, respectively, before the (n−2)-th transmission processing. As described above, the first data is temporarily stored in the (n−1)-th and subsequent storage positions in storage area 45.

In this state, terminal device 200 performs the (n−2)-th transmission processing. First, signal processing circuit 50 conducts a backward-in-time search of pieces of registration data in the past, starting from the latest registration data, and reads the pieces of registration data in storage area 45 toward the past. The maximum number of pieces of registration data that are read is the same as the number of the pairing patterns. More precisely, in the (n−2)-th transmission processing by terminal device 200, storage positions for the (n−2)-th registration data, the (n−3)-th registration data, and so forth up to the second registration data and the first registration data are set as reading range 45D, and pieces of registration data are sequentially read from these storage positions. In the (n−2)-th processing, since the number of pieces of registration data that are read is (n−2) that is smaller by 1 than the number of arranged pairing patterns, it is determined that, as a result of the comparison, the reading pattern that is made up of the pieces of registration data that are read is different from the pairing pattern, and signal processing circuit 50 transmits the second signal by radio.

Subsequently, in Step 4 shown in FIG. 3, when terminal device 200 is activated at the (n−1)-th time, the (n−1)-th registration data determination processing is performed before the (n−1)-th transmission processing, and as illustrated in the middle portion of FIG. 11, the (n−1)-th registration data is stored in a corresponding storage position in storage area 45. It is illustrated that, as the (n−1)-th registration data, the second data is set to be stored over again.

After that, terminal device 200 performs the (n−1)-th transmission processing. Signal processing circuit 50 conducts a backward-in-time search of pieces of registration data in the past, starting from the latest registration data, and reads the pieces of registration data in storage area 45 toward the past. The maximum number of pieces of registration data that are read is the same as the number of arranged pairing patterns. At the time of the n (n−1)-th transmission processing, storage positions for the (n−1)-th registration data, the (n−2)-th registration data, and so forth up to the second registration and the first registration data are set as reading range 45E, and the pieces of registration data are sequentially read from these storage positions. After that, the reading pattern is compared against the pairing pattern and a corresponding output signal is transmitted by radio. At this moment, it is assumed that it is determined that there is a difference between the reading pattern and the pairing pattern and thus that the second signal is set to be transmitted.

Subsequently, in Step 5 shown in FIG. 3, when terminal device 200 is activated at the n-th time, the n-th registration data determination processing is performed before the n-th transmission processing, and as illustrated in the lower portion in FIG. 11, the n-th registration data is stored in a corresponding position in storage area 45. It is illustrated that, as the n-th registration data, the second data is set to be stored over again.

After that, terminal device 200 performs the transmission processing at the time of the n-th activation. Signal processing circuit 50 conducts a backward-in-time search of pieces of registration data in the past, starting from the latest registration data, and reads the pieces of registration data in storage area 45 toward the past. The maximum number of pieces of registration data that are read is the same as the number of pairing patterns, and at the time of n-th transmission processing, storage positions for the n-th registration data, the (n−1)-th registration data, and so forth up to the third registration data and the second registration data are set as reading range 45F, and the pieces of registration data are sequentially read from these storage positions. After that, the reading pattern is compared against the pairing pattern. At this moment, it is assumed that a result of the determination is that the reading pattern is consistent with the pairing pattern. In this case, during the n-th activation, signal processing circuit 50 transmits the first signal (the pairing mode signal) by radio. Master wireless device 500 receives and determines the pairing mode signal. If a condition is satisfied, the pairing is completed. In the n-th transmission processing, the first registration data may not be used. The storage position for the first registration data corresponds to the above-described storage position for the registration data in the past.

In a case where the transmission processing is performed after the registration data determination processing, the m-th transmission processing is performed, directly using the determined m-th registration data, and then, the m-th registration data is stored in a corresponding storage position in storage area 45.

In this case, the fact that the reading range for determination of the pairing mode is not limited only to the setting is the same as described under the preceding section. That is, a reference target may be determined previously within the storage position. Based on registration data in a predetermined storage position, which is set to be the reference target, the determination of the pairing mode may be made. For example, it is also possible that when one out of every two storage positions is set to be the reference target, only with the act of changing the window or the door from the opened state to the closed state, or only with the act of doing the reverse, the determination of the pairing mode is made based on the registration data that is obtained. In this case, two or more storage positions are preferably set to be reference targets.

(10. Change of Processing by Successive Multiple-Time Activation of Terminal Device)

Figure 12:
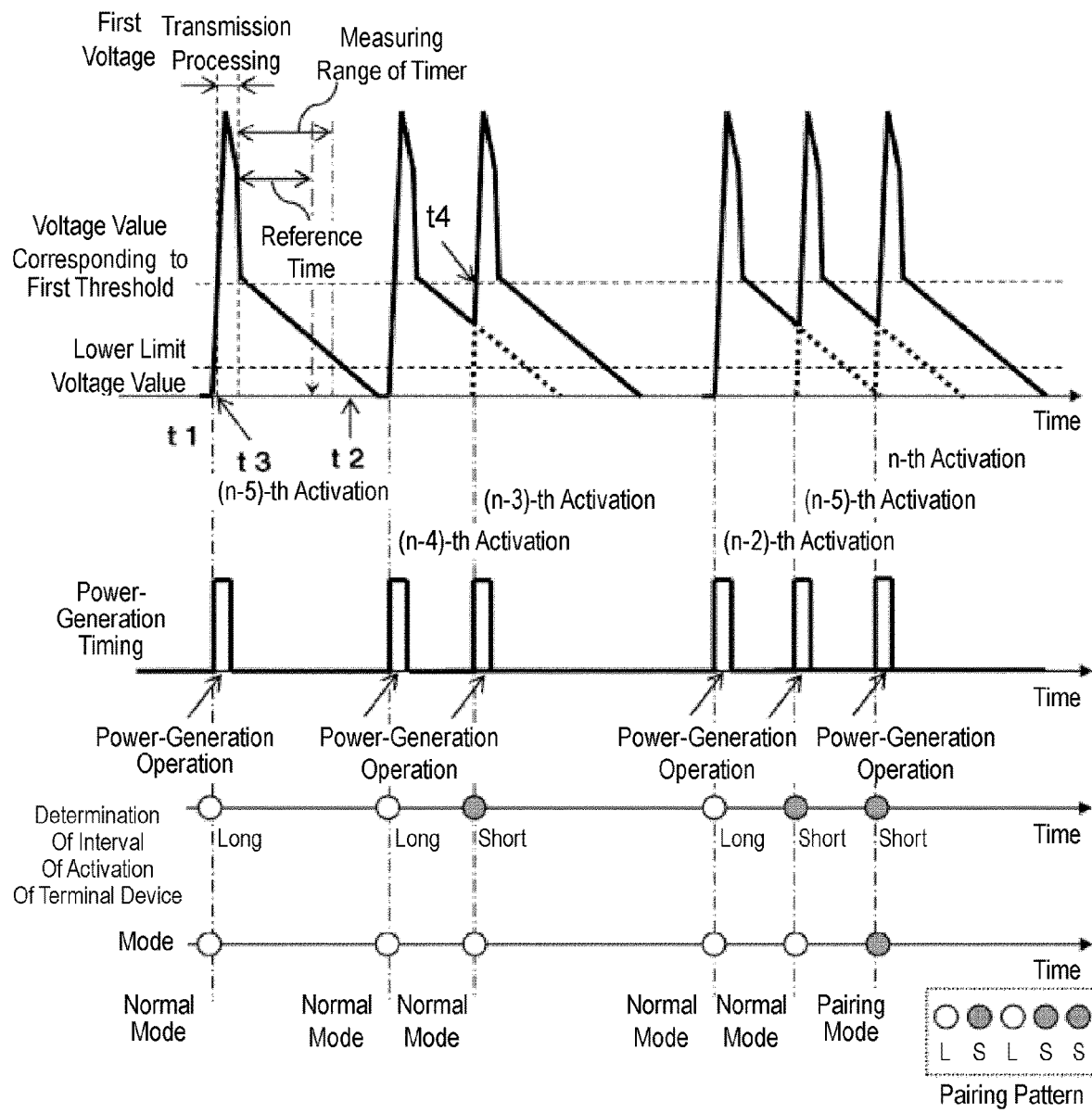
FIG. 12 is a diagram illustrating a change of processing in a case where the terminal device according to the first embodiment of the present invention is activated multiple times.

A change of processing in a case where terminal device 200 is activated successively multiple times will be described with reference to FIGS. 12 to 14. FIG. 12 illustrates the change of the processing in a case where the terminal device according to the first embodiment of the present invention is activated multiple times. As described above, a time interval at which terminal device 200 is activated may be short or long. In the description under this section, registration data indicating that the long time interval is defined as the first data and is expressed as "1". Registration data indicating the short time interval is defined as the second data and is expressed as "0". At this moment, the (n−6)-th activation is assumed to be equivalent to a long time interval. The first voltage at the time of (n−5)-th activation and the change of the processing are the same as in FIG. 4. It is determined that at the time of (n−4)-th activation, the time interval from the activation of terminal device 200 at the time of (n−5)-th activation is a long time. On the other hand, it is determined that at the time of (n−3)-th activation, the time interval of the activation of terminal device 200 from the time of the (n−4)-th activation is a short time. It is hereinafter determined that at the time of the (n−2)-th activation, the time interval of the activation of terminal device 200 from the time of the (n−3)-th activation is a long time, that at the time of (n−1)-th activation, the time interval of the activation of terminal device 200 from the time of the (n−2)-th activation is a short time, and that at the time of the n-th activation, the time interval of the activation of terminal device 200 from the time of the (n−1)-th activation is a short time. At the time of each activation, the registration data in accordance with a determination time is stored in a corresponding storage unit. In a case where the pairing pattern is "10100" (long-short-long short-short), since the pairing pattern is consistence with pieces of registration data stored in the storage units that are equivalent to the (n−5)-th to (n−1)-th storage positions takes place, it is determined that the pairing mode is entered and the first signal in the pairing mode is transmitted by radio. In a case where it is not determined that the pairing mode is to be entered, the second signal for a normal mode is wirelessly transmitted by radio.

Figure 13:
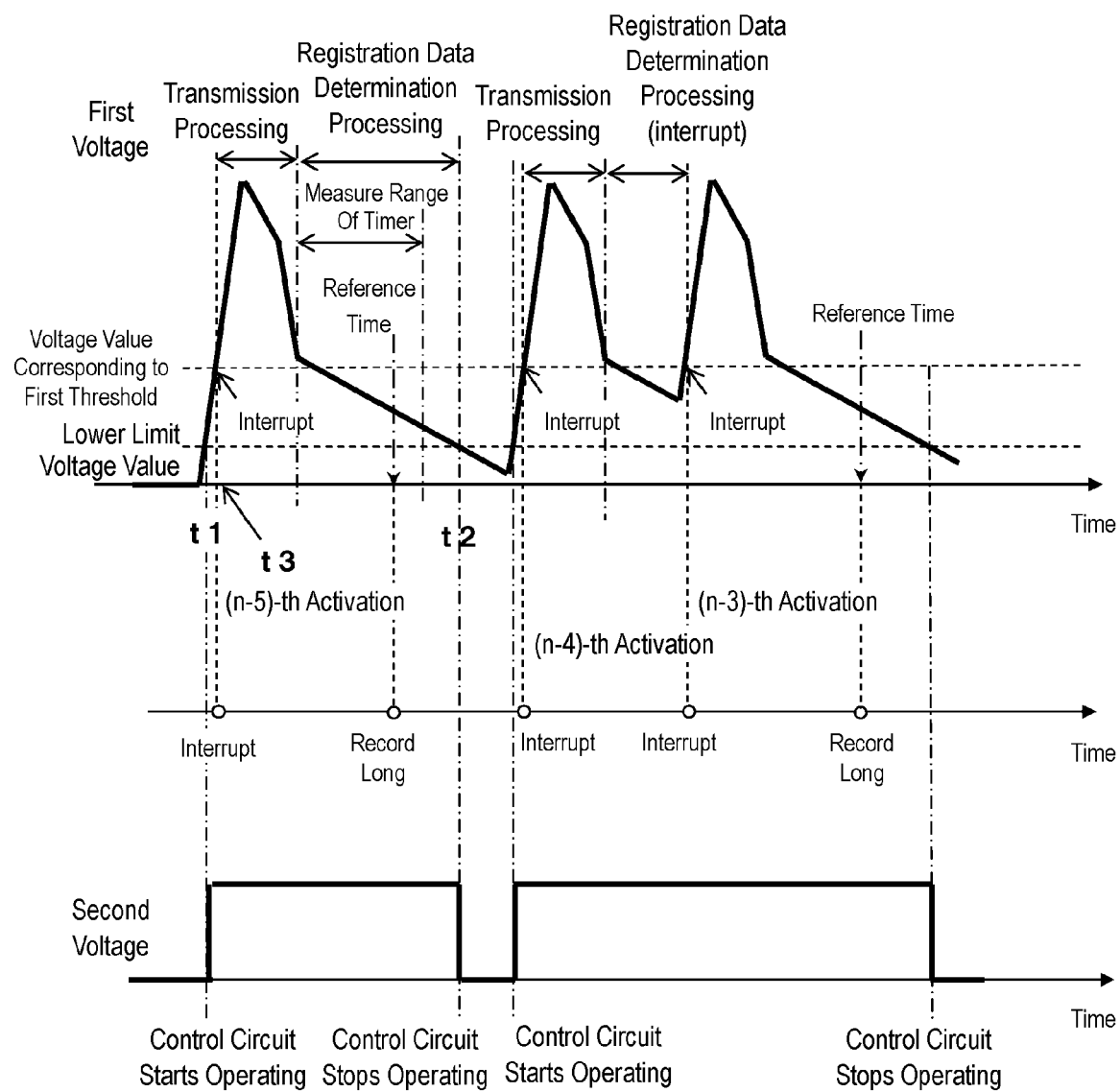
FIG. 13 is a magnified diagram illustrating a portion of FIG. 12.

FIG. 13 illustrates a portion of FIG. 12 which is enlarged. At the time of the (n−5)-th activation, in the registration data determination processing, the registration data is stored as the first data after the time measured by timer 80 exceeds the reference time. At time t2 at which the first voltage falls below the lower limit voltage value, control circuit 40 stops. At the time of the (n−4)-th activation, when the first voltage exceeds the lower limit voltage value, control circuit 40 starts to operate. The value of the first voltage exceeds the first threshold at third time t3, and interruption occurs. In the registration data determination processing at the time of (n−5)-th activation, the first data indicating a long time interval as the registration data is stored. More precisely, it is determined that the time interval of up to the last time activation of terminal device 200 is long and the transmission processing is performed. After the transmission processing, the registration data determination processing starts, but with the power generation by power generator 10 before the time measured by timer 80 exceeds the reference time, the value of the first voltage exceeds the first threshold at fourth time t4, as described above. Accordingly, the interruption occurs. In the transmission processing, in this case, since the first data as the registration data is not stored, the registration data is set to be the second data indicating that the time interval of the activation of terminal device 200 is short. This method will be described later.

Figure 14:
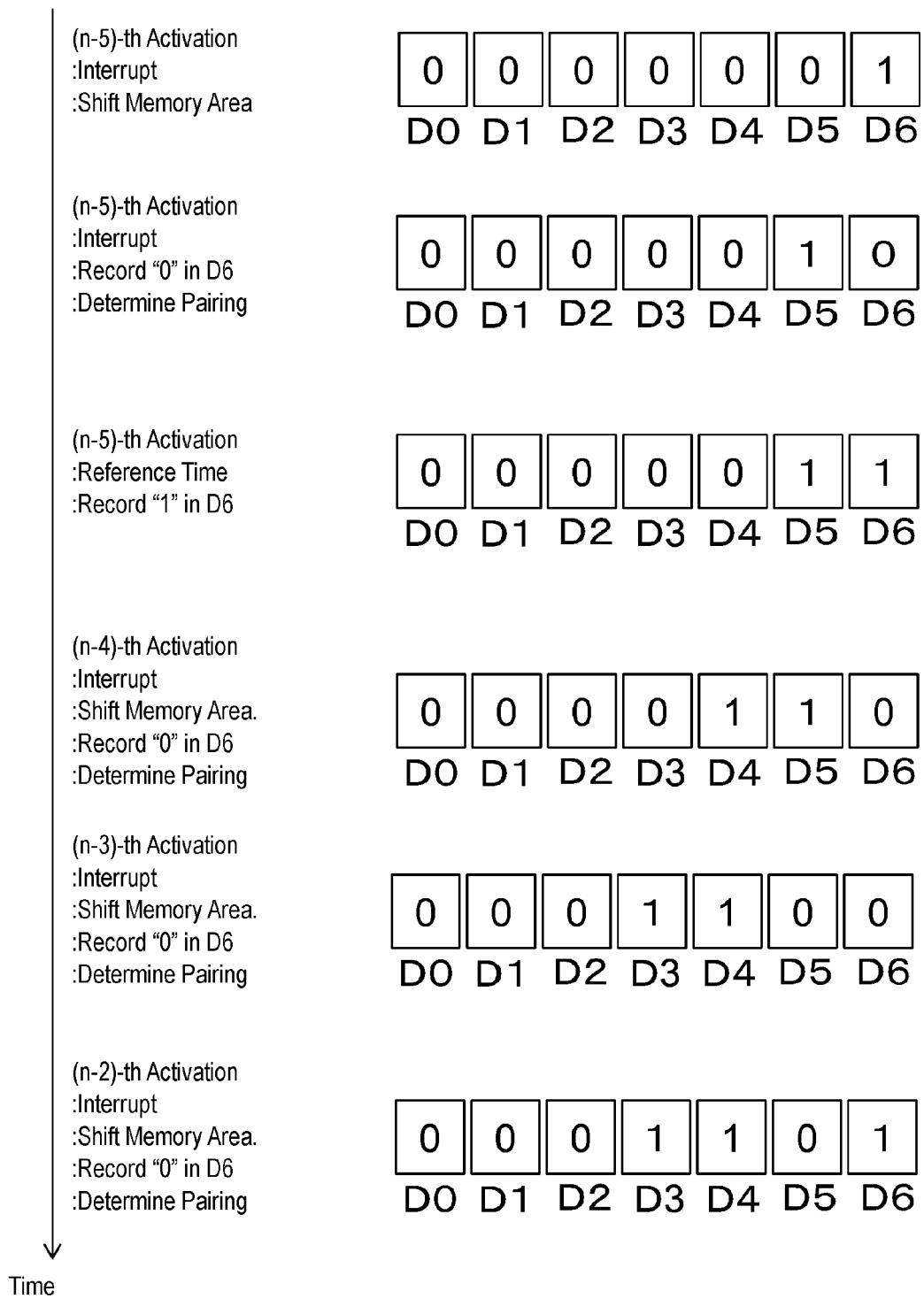
FIG. 14 is a diagram illustrating a flow for storing the registration data in the nonvolatile memory in the processing in FIG. 12 in the terminal device according to the first embodiment of the present invention.

FIG. 14 is a diagram illustrating a flow for storing the registration data in the nonvolatile memory in the processing shown in FIG. 12. Squares in FIG. 14 indicate storage units D0 to D6 of storage area 45 of nonvolatile memory 44.

Since it is assumed that the (n−6)-th activation corresponds to a long time interval, value "1", which indicates that the time interval of the activation of the terminal device is long, is stored in storage unit D6 at the time of the (n−5)-th activation. With the interruption, data shift processing is performed that causes the registration data in storage unit Dp of storage area 45 to transition to storage unit Dp−1, where p is a positive integer and 6≥p≥1). Next, value "0", which indicates that the time interval of the activation of the terminal device is short, is stored in storage unit D6. Next, pairing determination is made. At this moment, since the pairing pattern is set to "10100" (long-short-long-shortshort), pieces of registration data in storage units D1 to D5 are "10000", and thus these patterns are not consistent. Consequently, it is determined that the normal mode is entered. Since the time measured by timer 80 exceeds the reference time in (n−5)-th activation, value "1", which indicates that the time interval of the activation of the terminal device is long, is stored in storage unit D6 after the measured time exceeds the reference time. The registration data determination processing is ended.

At the time of the (n−4)-th activation, data shift processing, the storing of value "0" in storage unit D6, and the pairing determination are performed. Before the time measured by the timer exceeds the reference time, the (n−3)-th activation is started with the power generated by power generator 10.

Since the measurement time measured by timer 80 does not exceed the reference time at the time of the (n−3)-th activation, value "0" remains stored in storage unit D6 at the time of the (n−4)-th activation without value "1" being stored. More precisely, value "0" indicating that the time measured by timer 80 does not exceed the reference time is stored previously, and thus, it can be determined, at the time of the next activation, that the time interval of the activation of terminal device 200 is short.

Since the time measured by timer 80 in the (n−3)-th activation exceeds the reference time, "1" is stored in storage unit D6 at the time of the (n−2)-th activation.

As described above, the time interval of the activations of terminal device 200 is registered. Although the interruption occurs due to the power generation before the time measured by timer 80 exceeds the reference time, the pairing mode can be determined.

Storage unit Dp that is set to be a reference target for determining the pairing mode is not limited only to the case described above. For example, the reference target may be determined previously within storage unit Dp. Based on a registration data in a predetermined storage unit, which is set to be the reference target, the determination of the pairing mode may be made. For example, one storage unit out of every two storage units may be set to be the reference target, and only with the act of changing the window or the door from the opened state to the closed state, or only with the act of doing the reverse, the determination of the pairing mode is made based on the registration data that is obtained. Two or more storage units are preferably set to be at least reference targets.

Timer 80 may be a counter that periodically performs counting time at a time interval. Based on a value measured by the counter, registration data in a corresponding storage unit may be updated one or multiple times.

(11. Pairing Sequence in Wireless System)

Figure 15A:
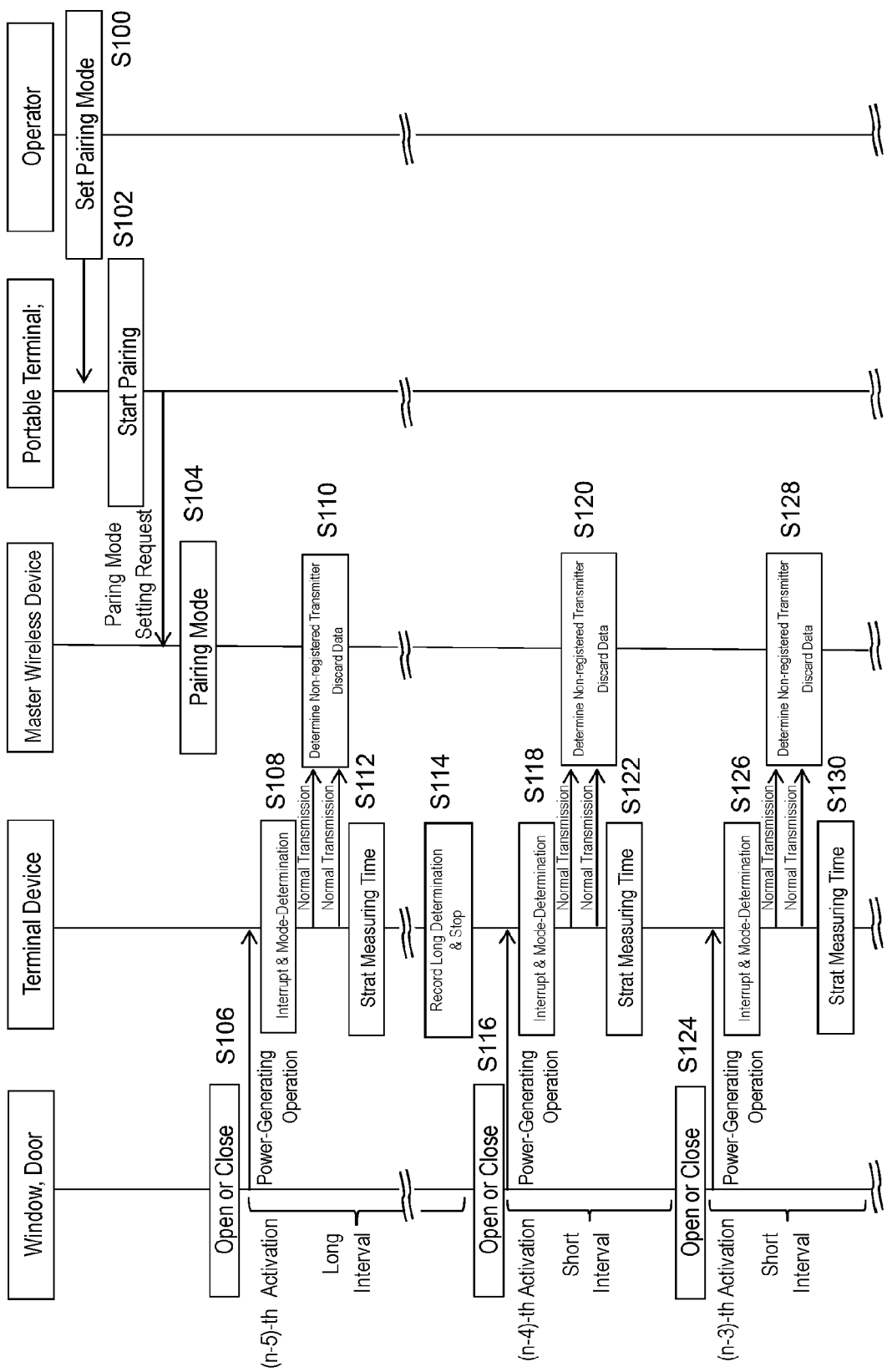
FIG. 15A is a diagram illustrating a pairing sequence for a wireless system according to the first embodiment of the present invention.
Figure 15B:
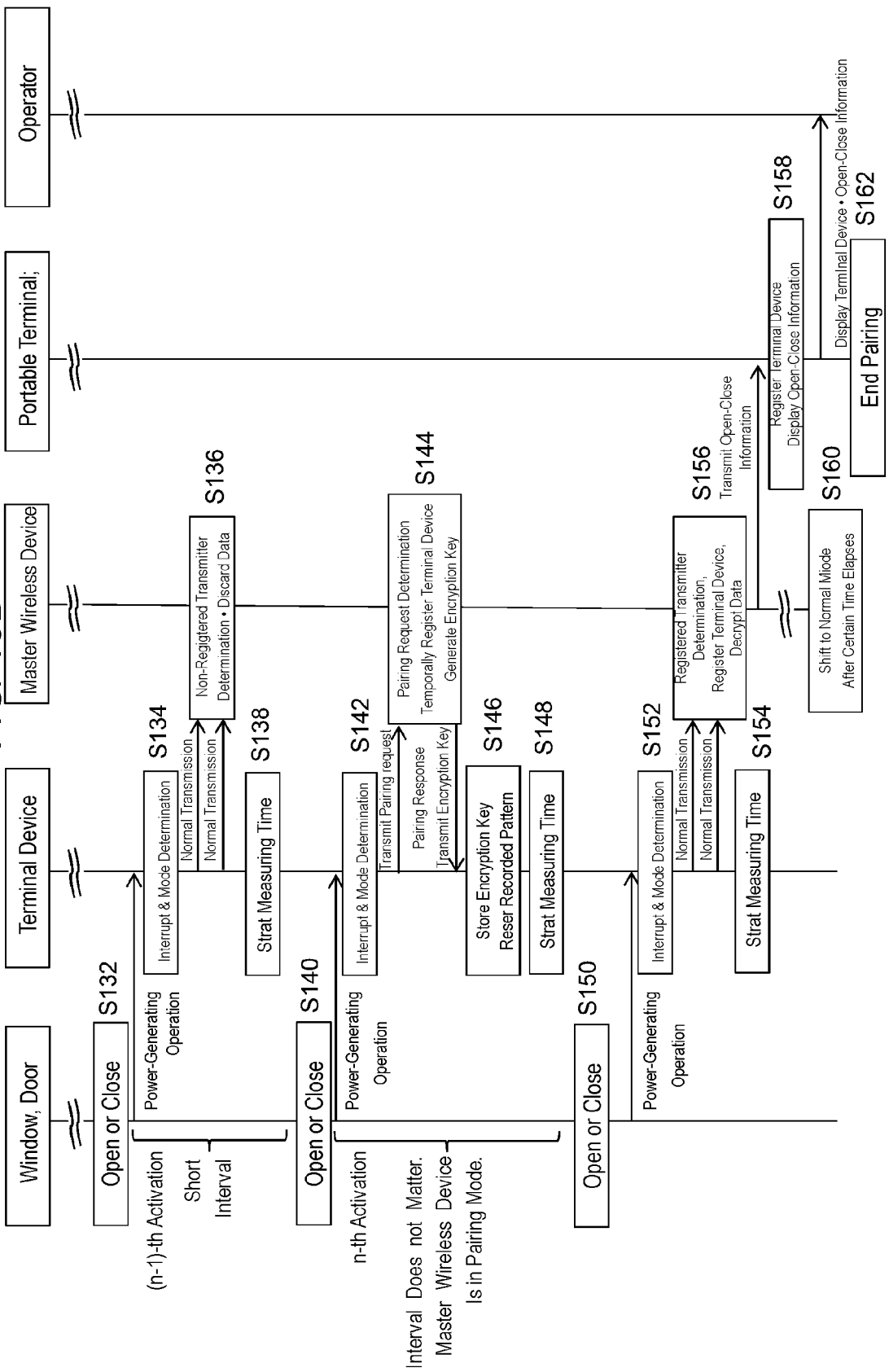
FIG. 15B is a diagram illustrating a pairing sequence for the wireless system according to the first embodiment of the present invention.

The pairing sequence in the wireless system will be described with reference to FIGS. 15A and 15B. The present sequence corresponds to FIGS. 12 to 14.

First, in Step S100 (Step is hereinafter omitted), the operator operates a mobile terminal device, such as a smartphone or a tablet, along a predetermined procedure to set master wireless device 500 on the receiver side to the pairing mode. Accordingly, the pairing illustrated in Step S102 is started through the mobile terminal device. More precisely, an operation performed by the operator on the mobile terminal device causes, in step S102, the mobile terminal device to make a request to master wireless device 500 for pairing mode setting. In step S104, master wireless device 500 proceeds to the pairing mode. In step S106, by opening or closing the window or the door (which is expressed as activating activator 10A), a power generation operation is performed in terminal device 200 on the transmitter side. In step S108, terminal device 200 performs the interruption and mode determination. In the (n−5)-th activation, as described above, it is determined that the normal mode is entered, and normal transmission to master wireless device 500 is performed. More precisely, the second signal is transmitted to master wireless device 500. The normal transmission of the data is performed two times. If master wireless device 500 receives the same data, master wireless device 500 can assure that the normal transmission succeeds, and can enhance reliability. The transmission is limited to two times, but the number of times that transmission is performed depends on an amount of power generated by power generator 10. Although the transmission is performed one time, if it is confirmed that the normal transmission can be performed by the other method, the one-time transmission may be allowable. In step S110, master wireless device 500 determines that a non-registered transmitter is exists, and discards the data that is conveyed by the transmitted second signal. The transmitted data indicates opened and closed states that result whenever the window or the door is opened and closed. In step S112, terminal device 200 causes timer 80 to start to measure time. In step S114, since the time measured by timer 80 exceeds the reference time, terminal device 200 performs long-time determination recording. After that, the first voltage falls below the lower limit voltage value, and thus, terminal device 200 stops. In step S116, activator 10A is activated and terminal device 200 operates for generating power. In step S118, terminal device 200 performs the interruption and the mode determination. In the (n−4)-th activation, as described above, it is determined that the normal mode is entered, and the normal transmission to master wireless device 500 is performed.

In step S120, master wireless device 500 determines that the non-registered transmitter exists, and discards the transmitted data. In step S122, terminal device 200 causes timer 80 to start to measure time. In step S124, without the time measured by timer 80 exceeding the reference time, activator 10A is activated and terminal device 200 operates for the power generation. In step S126, terminal device 200 performs the interrupting and the mode determination. In the (n−3)-th activation, as described above, it is determined that the normal mode is entered, and the normal transmission to master wireless device 500 is performed.

Subsequently, in steps S128 and S136, in a case where the normal transmission is received, master wireless device 500 determines that the non-registered transmitter exists, and discards the data. In steps S130 and S138, terminal device 200 causes timer 80 to start to measure the time. In steps S132 and S140, activator 10A is activated and terminal device 200 operates for power generation.

In step S142, terminal device 200 performs the interruption and the mode termination. In the n-th activation, as described above, the registration data is consistent with the pairing pattern. Accordingly, terminal device 200 generates the first signal in accordance with the pairing mode, and transmits a pairing request to master wireless device 500. In step S144, master wireless device 500 makes a pairing request determination, performs temporary registration of terminal device 200 and generation of an encryption key, and thus, transmits a pairing response and the encryption key to terminal device 200. In step S146, terminal device 200 retains the encryption key and resets a recording pattern. The recording pattern is the registration data with storage area 45 in a range where the comparison against the pairing pattern is made. In step S148, terminal device 200 causes timer 80 to start to measure the time. In step S150, the activator 10A is activated and terminal device 200 operates for generating power. In step S152, terminal device 200 performs the interruption and the mode determination. It is determined that the normal mode is entered and transmission data encrypted with the encryption key transmitted in preceding step S144 is normally transmitted, as the second signal, to master wireless device 500. In step S154, terminal device 200 causes timer 80 to start to measure the time. In step S156, master wireless device 500 checks the encryption key of the transmission data transmitted in step S152 against the encryption key transmitted in preceding step S144, and makes a registration-completed transmitter determination. If it is checked that temporarily registered terminal device 200 is present, master wireless device 500 definitively registers terminal device 200, decodes the encryption data transmitted, registers opening and closing information and terminal device 200 in addition to the opening and closing information, and thus transmits information on terminal device 200 that is definitively registered, to the mobile terminal device. In step S158, the mobile terminal device displays a registered and opened and closed state of terminal device 200 that is definitively registered. That is, the information on terminal device 200 that is definitively registered or the opening and closing information is presented to the operator, and the pairing through the mobile terminal device ends in step S162. In step S160, after the predetermined time elapsed, master wireless device 500 proceeds to the normal mode.

The wireless system thus proceeds from the normal mode to the pairing mode. After ending a prescribed operation, the wireless system returns to the normal mode.

With the control that is performed in step S150, the operator can check, based on the mobile terminal device, that the pairing with terminal device 200 which is a target is completed.

(12. Transition of State of Control Circuit)

Figure 16:
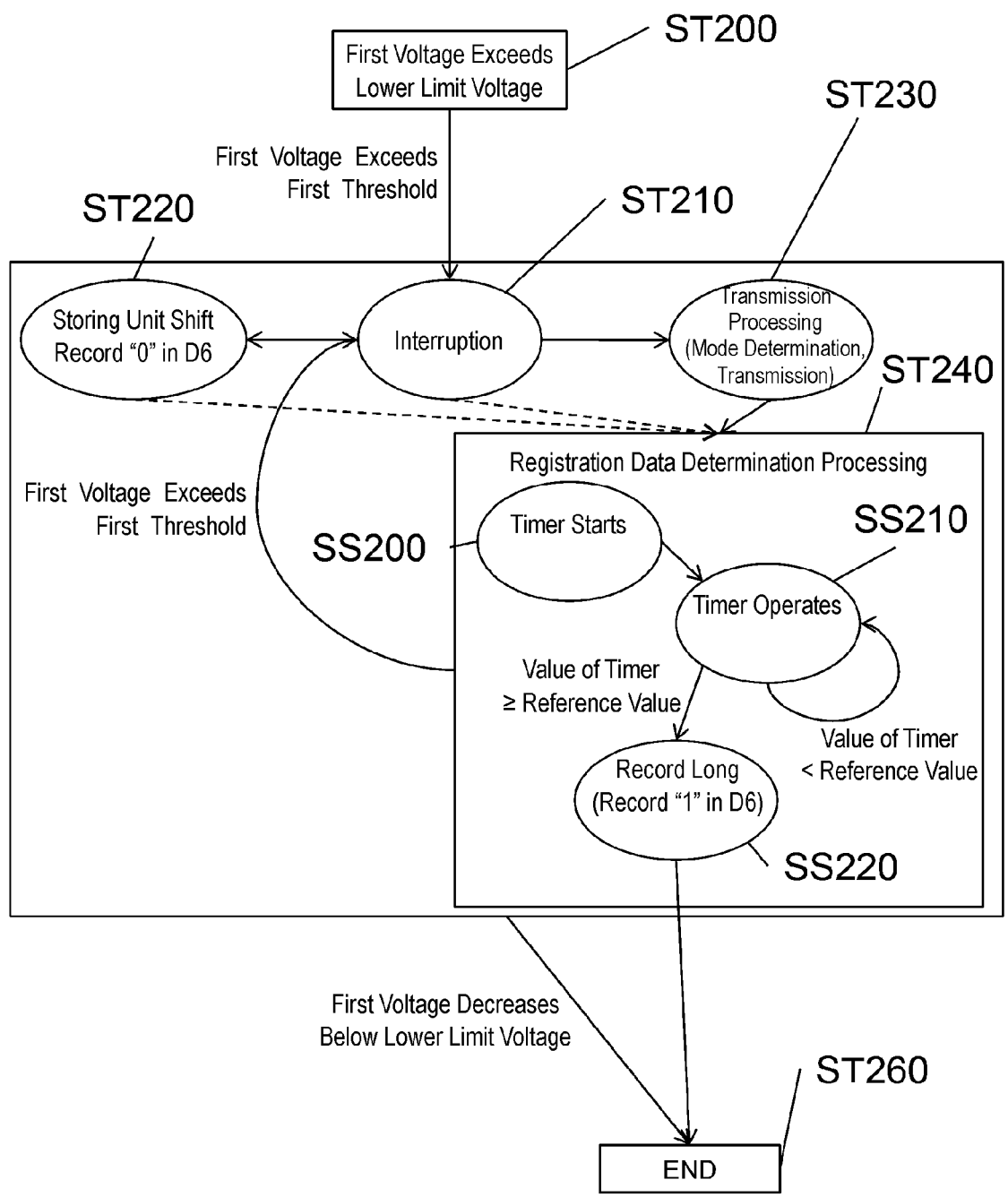
FIG. 16 is a diagram illustrating a change in a state of the terminal device according to the first embodiment of the present invention.

Transition of a state of control circuit 40 until terminal device 200 performs the pairing will be described with reference to FIG. 16.

First, in state ST200 (State is hereinafter omitted), the first voltage exceeds a lower limit voltage and control circuit 40 starts to operate.

Next, the first voltage exceeds the first threshold, and proceeding to the interruption in step ST210 takes place. The clause, "a first voltage exceeds the first threshold, refers to the fact that the first voltage changes from a value that is lower than the first threshold to a value that is higher than the first threshold, and does not mean that the first voltage is always higher than the first threshold.

With the interruption, storage area shift and value "0" is recorded in storage unit D6 in ST220, and the transmission processing in state ST230 is performed. In the transmission processing, the output signal transmitted is determined. More precisely, the mode determination and the transmission are performed. States ST220 and ST230 may be performed simultaneously. After one step is ended, the other step may be performed. After state ST230 is ended, the registration data determination processing in ST240 is performed. The registration data determination processing in state ST240 is performed after the transmission processing, but may be ended after the interruption in state ST210. Alternatively, the registration data determination processing may be performed after state ST220 is ended.

In the registration data determination processing in state ST240, first, timer 80 starts in state SS200. Next, processing to the operation of the timer in state SS210 takes place. In state SS210, in a case where the value measured by the timer is lower than the reference value, the operation of the timer in state SS210 continues. In a case where the value measured by the timer is higher than the reference value, proceeding to long-time recording in SS220 takes place. The case where the measured value is lower than the reference value may be the case where the value measured by the timer may be equal to or lower than the reference value. In this case, the measured value higher than the reference value is defined as the measured value higher than the reference value, thus establishing an exclusive relationship.

For the long-time recording in step S220, value "1" is recorded in storage unit D6. Furthermore, in the registration data determination processing in state ST240, in a case where the first voltage exceeds the first threshold, proceeding to the interruption in ST210 takes place. More precisely, in a case where the time interval of current time activation of terminal device 200, which is described above, is short, the long-time recording is not performed without proceeding to state SS220.

State SS220 is ended, but although any state is reached, when the first voltage falls below the lower limit voltage, the operation of control circuit 40 in state ST260 is ended.

In a case where the power is sufficient, the registration data determination processing in state ST240 may be started without waiting until the transmission processing in state ST230 is ended. However, state ST220 is ended before state SS220 starts, and thus consideration need to be given to not overwriting the registration data at the time up to the last time activation. In the case of FIG. 16, state ST220 is caused to be ended before the value measured by the timer is higher than the reference value.

Second Exemplary Embodiment

A terminal device and a method of controlling the terminal device according to a second embodiment and a wireless communication system that uses the terminal device will be described with reference to FIGS. 1 to 3 and 17 to 26. FIGS. 1 to 3 illustrate the same configuration as the first embodiment. A detailed description of a constituent element that is given the same reference numeral is omitted. Furthermore, the sections of (1. Relationship between Terminal device and Master Wireless Device), (2. Electrical Configuration of Terminal device), and (3. Electrical Configuration of Master Wireless Device) are the same as the first embodiment, and thus detailed descriptions thereof are omitted.

Control circuit 40 of the terminal device according to the second embodiment includes counter 80. Counter 80, if possibly controlled with control circuit 40, may be provided other than control circuit 40. Instead of counter 80, a timer may be used.

(4. Flow for Pairing Terminal Device and Master Wireless Device)

Next, a flow when pairing terminal device 200 with master wireless device 500 will be described with reference to FIG. 3. FIG. 3 is a flowchart for describing the flow when pairing between the terminal device and the master wireless device.

The operator switches master wireless device 500 to the pairing mode in Step 1 illustrated in FIG. 3. The operator is a user who uses terminal device 200, and examples of the user include a contractor that installs a window. After that, the operator, as illustrated in Steps 2 to 5 shown in FIG. 3, activates terminal device 200 repeatedly multiple times. That is, the operator repeatedly performs the act of opening the window in the closed state to which terminal device 200 is attached or closing the window in the opened state. Terminal device 200 is activated in each of Steps 2 to 4.

While being activated, terminal device 20 determines the registration data, determines the transmission signal that is based on registration data, which will be detailed later. Terminal device 200 transmits the second signal (the normal mode signal) in each of Steps 2 to 4. However, master wireless device 500 is not paired with terminal device 200 and thus ignores these second signals. In Step 5, when the operator activates terminal device 200 n times, in order to determine the transmission signal that is based on the registration data, control circuit 40 of terminal device 200 reads a predetermined pairing pattern and, for example, the first to (n−1)-th pieces of registration data and the n-th registration data, from nonvolatile memory 44, and compares the first to (n−1) pieces of registration data and the n-th registration data against the pairing pattern. In the case where the pairing pattern is consistent with the pattern that is read, terminal device 200 transmits the first signal (the pairing mode signal) by radio. After that, in Step 6, master wireless device 500 receives the first signal for determination. In a case where a condition is satisfied, master wireless device 500 sets terminal device 200 and completes the pairing.

(5. Change in Voltage During Activation of Terminal Device)

Figure 17:
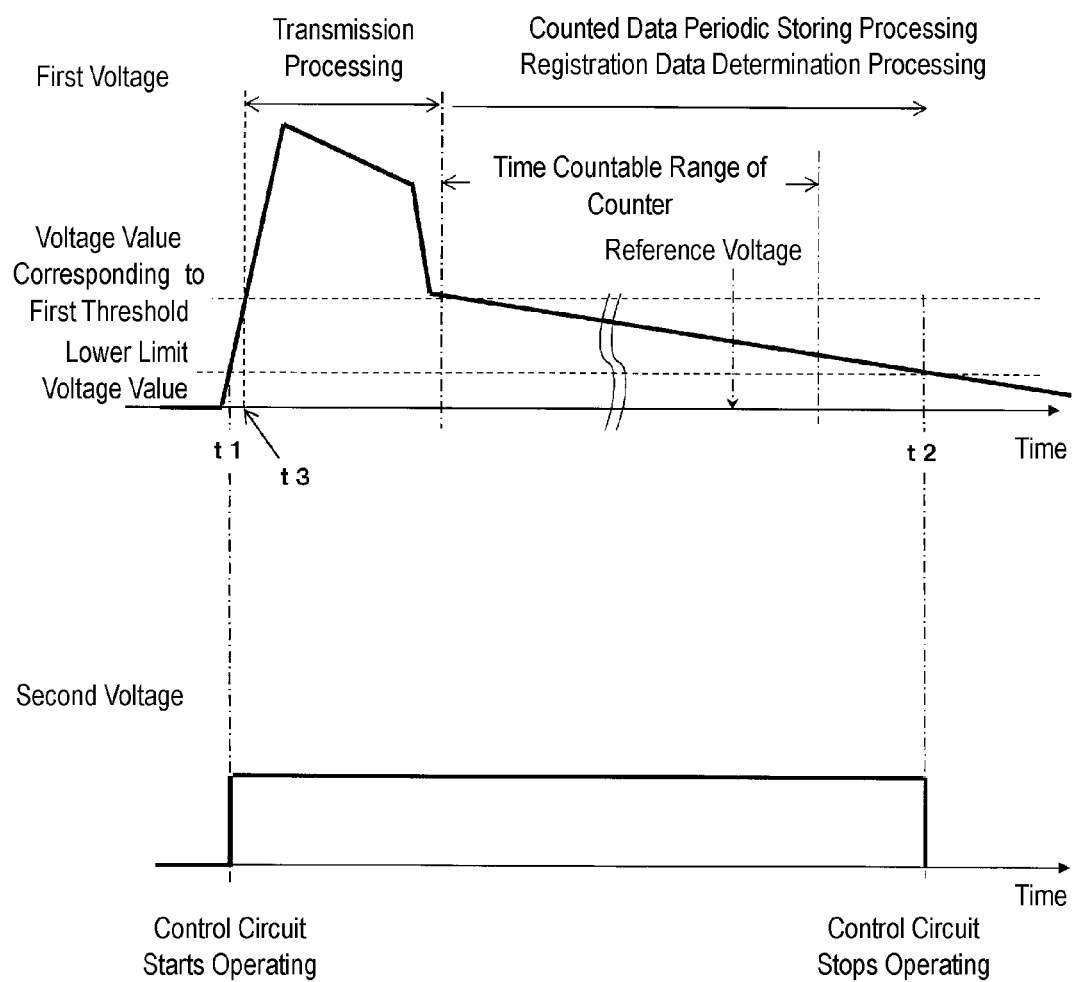
FIG. 17 is a diagram illustrating a change in a voltage during activation of a terminal device according to a second embodiment of the present invention.

Changes in the first voltage and the second voltage during the activation of terminal device 200 will be described. During the activation, terminal device 200 performs the transmission processing, count data periodic-retention processing, and the registration data determination processing, which will be described later. The change in the voltage differs in the order in which these processing operations are performed, but as an example, a case where the transmission processing is performed before the count data periodic-retention processing or the registration data determination processing is performed will be described below with reference to FIG. 17. FIG. 17 is a diagram illustrating the change in the voltage during the activation of the terminal device.

The operator performs an act activating terminal device 200, and thus power generator 10 built in terminal device 200 operates and generates electric power. The power generated by power generator 10 is stored in electric storage part 20. The value of the first voltage of electric storage part 20, as illustrated in FIG. 17, increases at a steep inclination over time. At first time t1, the value of the first voltage exceeds the lower limit voltage value at which control circuit 40 possibly operates. After first time t1, voltage converter 30 applies the constant second voltage to control circuit 40. The second voltage is a direct-current (DC) voltage.

Upon receiving the second voltage, control circuit 40 starts to operate and performs the transmission processing. The transmission processing includes the wireless transmission and thus needs a large amount of electric power. More precisely, much of the power stored in electric storage part 20 is consumed during the transmission processing. For this reason, the first voltage changes so as to have a peak value for the time when the transmission processing is in progress. After that, control circuit 40 performs the count data periodic-retention processing or the registration data determination processing. When performing the count data periodic-retention processing or the registration data determination processing, control circuit 40 also consumes power, but the amount of the consumed power may be smaller than during the transmission processing. For this reason, after the transmission processing, the first voltage decreases gradually with the lapse of time.

With the consumption of the power, the first voltage falls below the lower limit voltage value at second time t2. At a time point at which the first voltage falls below the lower limit voltage value, the supplying of the second voltage to control circuit 40 is stopped. Accordingly, control circuit 40 stops operating. Terminal device 200 possibly operates for a duration from first time t1 to second time t2 with only a limited amount of the power from power generator 10.

(6. Outline of Operation of Terminal Device)

Figure 18:
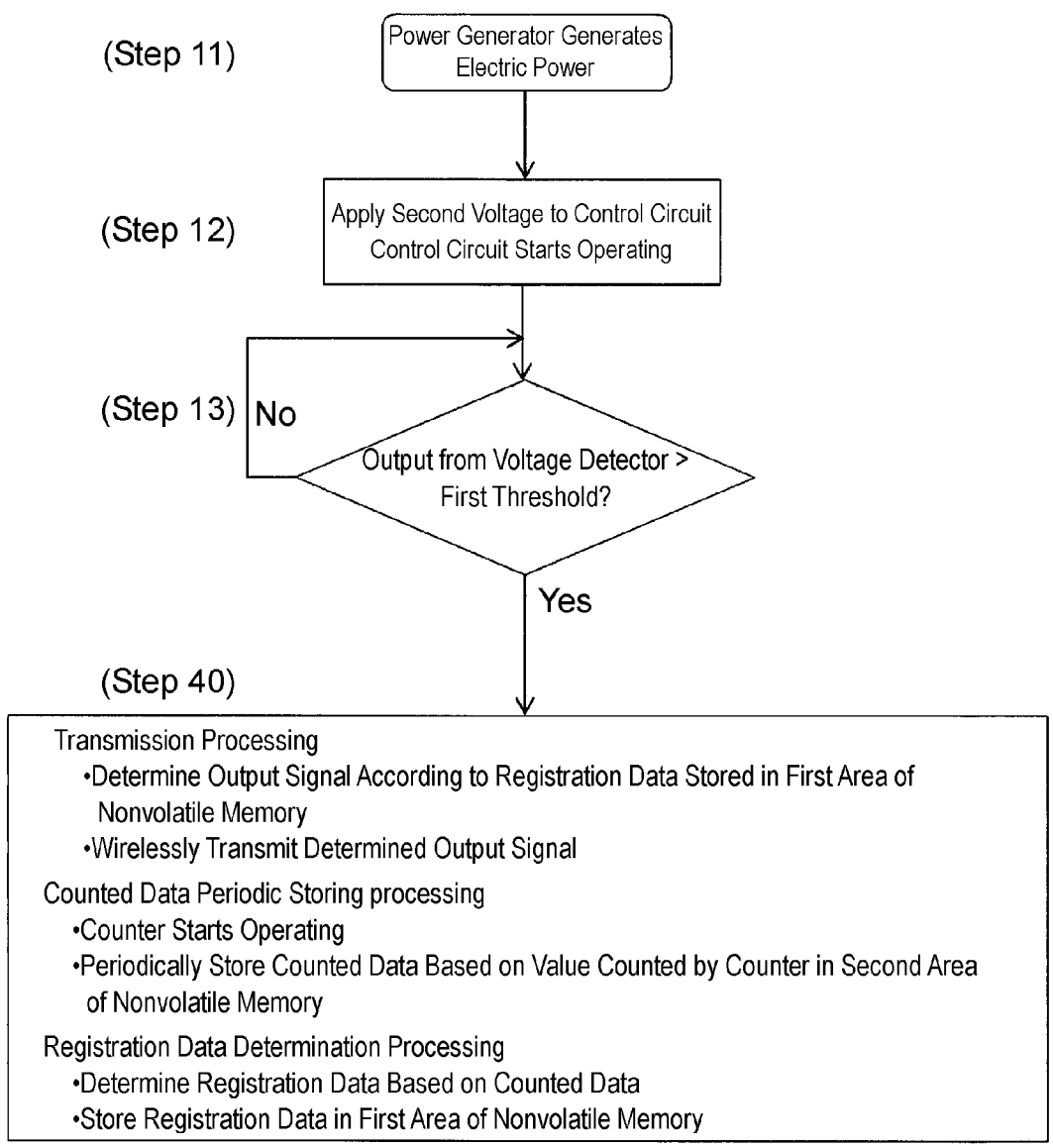
FIG. 18 is a flowchart illustrating an outline of operation of the terminal device according to the second embodiment of the present invention.
Figure 19:
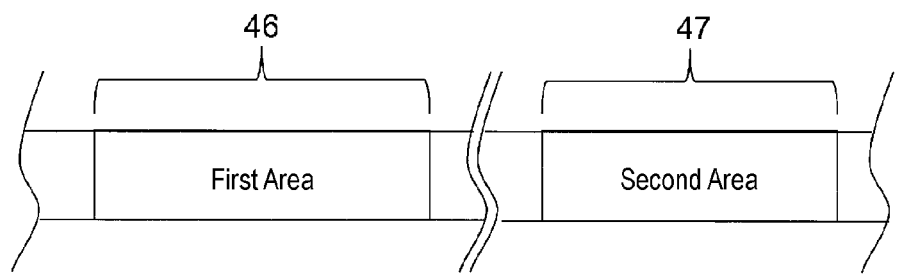
FIG. 19 is a diagram that schematically illustrates a first area and a second area of a nonvolatile memory of the terminal device according to the second embodiment of the present invention.

An outline of operation of terminal device 200 will be described below with reference to FIGS. 18 and 19 as well as FIG. 17. FIG. 18 is a flowchart illustrating the outline of the operation of the terminal device. FIG. 19 is a diagram that schematically illustrates a first area and a second area of the nonvolatile memory of the terminal device.

The operator performs the act activating terminal device 200. For example, the window to which terminal device 200 is attached is opened and closed, and thus power generator 10 built in terminal device 200 operates, resulting in the activating of terminal device 200. That is, in terminal device 200, as is illustrated in Step 11 in FIG. 18, similarly to the first embodiment, electric power is generated by power generator 10, and an amount of electric charge that is as large as a limited amount of power is stored in electric storage part 20. After that, in Step 12, the second voltage is applied to first input unit 41 of control circuit 40 at first time t1 in Step 12, and control circuit 40 starts to operate.

On the other hand, the first voltage is input at all times into voltage detector 70. Voltage detector 70 inputs the output value in accordance with the first voltage at all times into second input unit 42 of control circuit 40. Control circuit 40 has the first threshold against which the output value of voltage detector 70 is compared. After control circuit 40 starts to operate, in Sep 13, signal processing circuit 50 makes a comparison to determine whether or not the output value from voltage detector 70 exceeds the first threshold. In the case where the output value from voltage detector 70 does not exceed the first threshold, Step 13 is repeated.

In the case where the output value from voltage detector 70 exceeds the first threshold, the processing by signal processing circuit 50 proceeds to Step 40. In Step 40, signal processing circuit 50 performs three processing: the transmission processing; the count data periodic-retention processing; and the registration data determination processing, which are described above. The three types of processing include predetermined processing performed on nonvolatile memory 44. At this moment, an area within nonvolatile memory 44 is not specially divided, but in order to provide a description for easy understanding, the area within nonvolatile memory 44, which is used for the three types of processing, is expressed below as first area 46 and second area 47 for description. FIG. 19 is a diagram that schematically illustrates the first area and the second area of the nonvolatile memory of the terminal device. As illustrated in FIG. 19, nonvolatile memory 44 has first area 46 as an area for the registration data and second areas 47 as an area for counted data. Second area 47 is equivalent to a retention position in which the measured time at the time of the m-th activation is periodically retained.

In the transmission processing in Step 40, the output signal is determined according to the registration data stored in first area 46 of nonvolatile memory 44. The determined output signal is transmitted by radio. In the count data periodic-retention processing, counter 80 operates, and the counted data based on the counted value is periodically stored in second area 47 of nonvolatile memory 44. The counted data may be the counted value per se. In the registration data determination processing, the registration data is determined based on the counted data. Furthermore, the registration data is stored in first area 46 of nonvolatile memory 44. The order of the three types of processing is not particularly limited.

(7. Counted Data Periodic-Retention Processing in Terminal Device)

Figure 20:
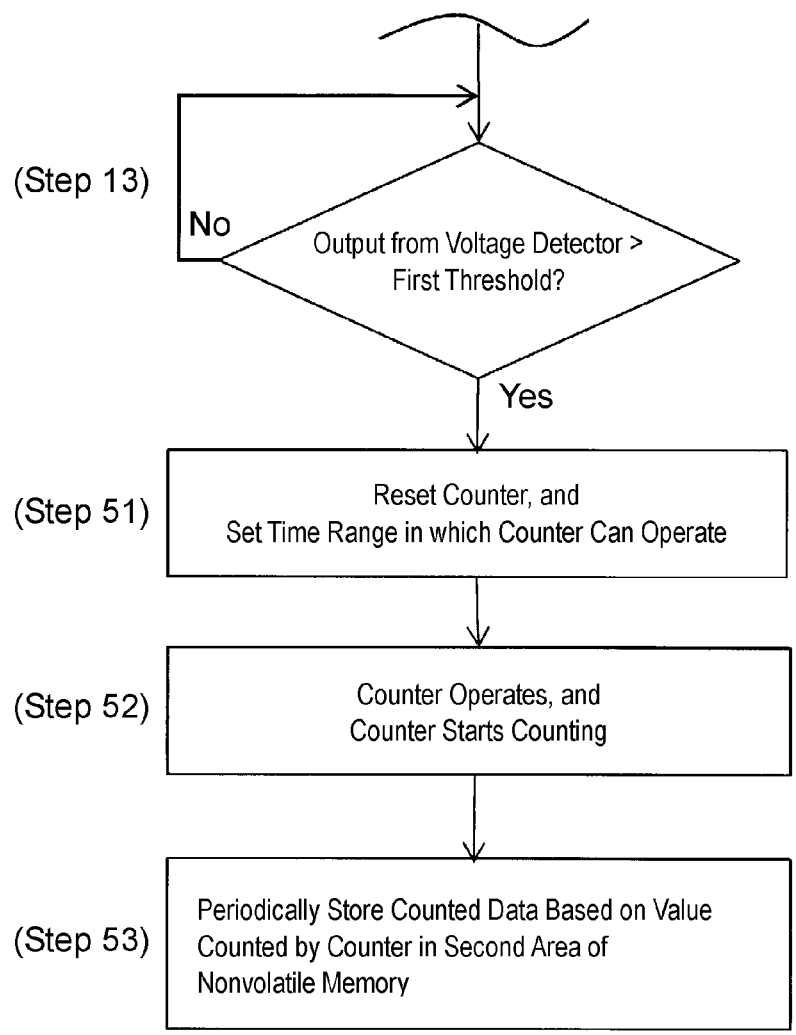
FIG. 20 is a flowchart illustrating a flow for count data periodic-retention processing in the terminal device according to the second embodiment of the present invention.

First, the counted data periodic-retention processing in terminal device 200 will be described with referent to FIG. 20 as well as FIG. 17. FIG. 20 is a flowchart illustrating a flow for the counted data periodic-retention processing in the terminal device.

When terminal device 200 is activated, signal processing circuit 50, as described above, compares the output value from voltage detector 70 against the first threshold in Step 13. Similarly to the first embodiment described above, it is assumed that the output value from voltage detector 70 exceeds the first threshold at third time t3 and that, as is illustrated in FIG. 20, the processing by signal processing circuit 50 proceeds to Step 51. Signal processing circuit 50 resets counter 80 in Step 51. Signal processing circuit 50, as illustrated in FIG. 17, sets a time range where counter 80 possibly operates and the reference time. Signal processing circuit 50 sets a predetermined value in accordance with the counted data that is based on the counted value counted by counter 80 in a case where the reference time is reached. Counter 80 is controlled in signal processing circuit 50. Under the control of signal processing circuit 50, counter 80 starts to operate from a starting-end time of the time range which is set. The starting time ends at third time t3 or later. When the starting-end time of the time range, which is set, is reached, counter 80 stops operating under the control of signal processing circuit 50.

After that, proceeding to Step 52 takes place, and counter 80 starts to operate from the starting-end time or later under the control of signal processing circuit 50. Counter 80, for example, keeps count a clock in oscillator 72. For the counted value that is counted by counter 80, the counted value is preferably obtained incremental counting or decremental counting that adds or subtracts a constant numerical value, respectively, every time a constant time elapses.

In Step 53, signal processing circuit 50 periodically retains, in second area 47 of nonvolatile memory 44, the counted data which is based on the counted value from counter 80 that increases or decreases with the lapse of time. The counted data may be the counted value per se. The retaining of the counted data in second area 47 may be performed every time the counted value increases or decreases, or setting of the time interval for separate retention may be performed. As understood from the description provided above, counter 80 measures the time that elapses from the starting-end time at which the counting starts, or later. For this reason, it is also possible that, instead of counter 80, the timer is used. Counter 80 may stop at second time t2 without providing an ending-end time. Furthermore, the reference time is exceeded and the counted data that is obtained is retained in second area 47 of nonvolatile memory 44, and then the counter 80 may be stopped without continuing the counting until the ending-end time.

During the counting by counter 80 and before the reference time is reached, the output value from voltage detector 70 is lower than the first threshold. In this state, power generator 10 may operate again. In this case, the output value from the voltage detector 70 which falls below the first threshold exceeds the first threshold again at the fourth time, and control circuit 40 replaces the fourth time with the third time, and repeats the control described above. More precisely, terminal device 200 starts to be in a next time activation state from the fourth time. Even in this case, since the counted data during the last time activation is periodically retained in second area 47, the last time counted data that is the counted data that is obtained at a time that immediately precedes the fourth time is reliably retained in second area 47. The count data periodic-retention processing is preferably performed last during the activation of terminal device 200, considering a power consumption.

(8. Registration Data Determination Processing in Terminal Device)

Figure 21:
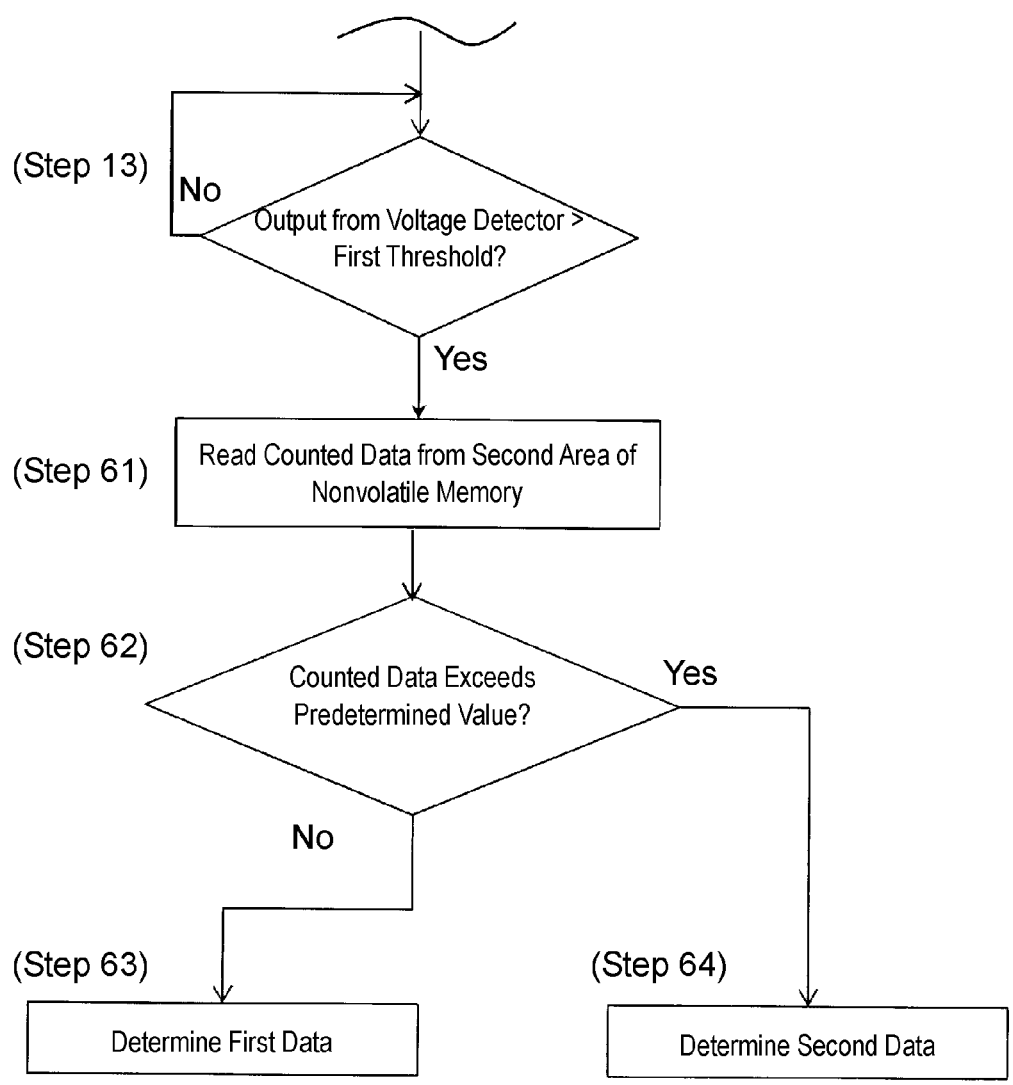
FIG. 21 is a flowchart illustrating a flow for a registration data determination processing in the terminal device according to the second embodiment of the present invention.
Figure 22:
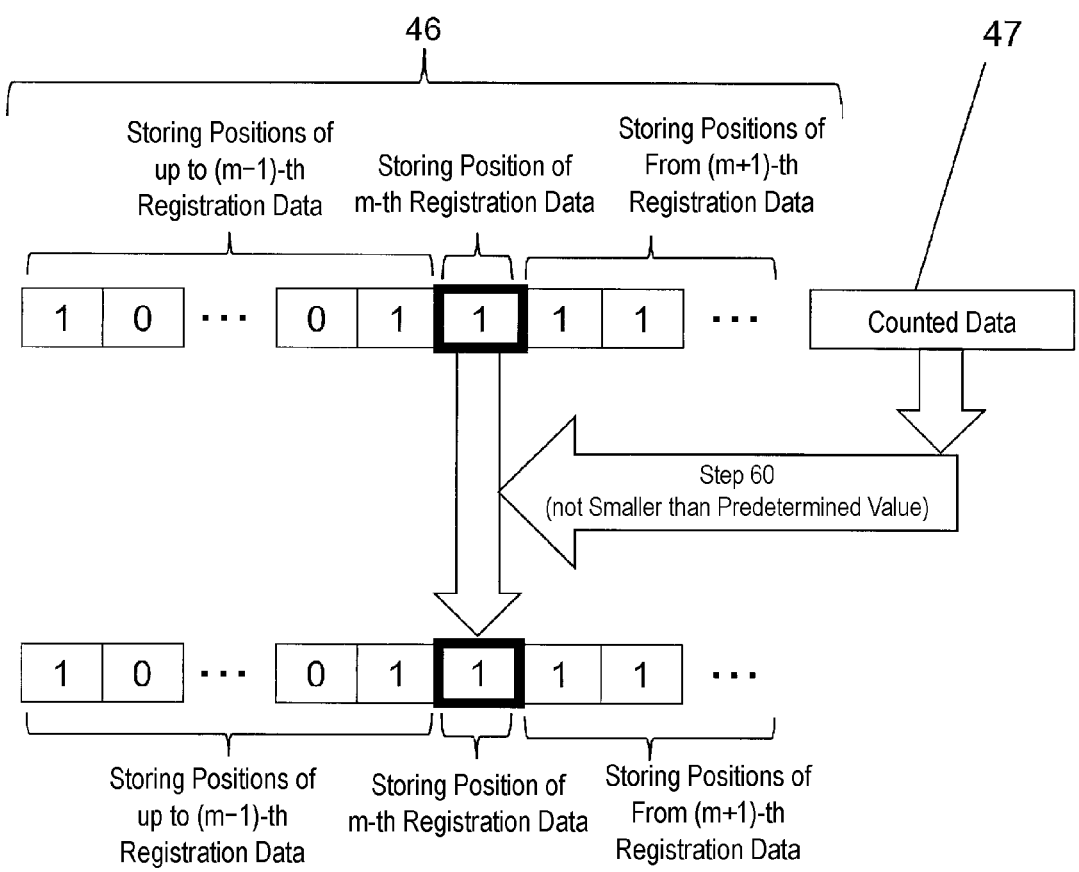
FIG. 22 is a diagram illustrating a flow for storing registration data in the nonvolatile memory in the terminal device according to the second embodiment of the present invention.
Figure 23:
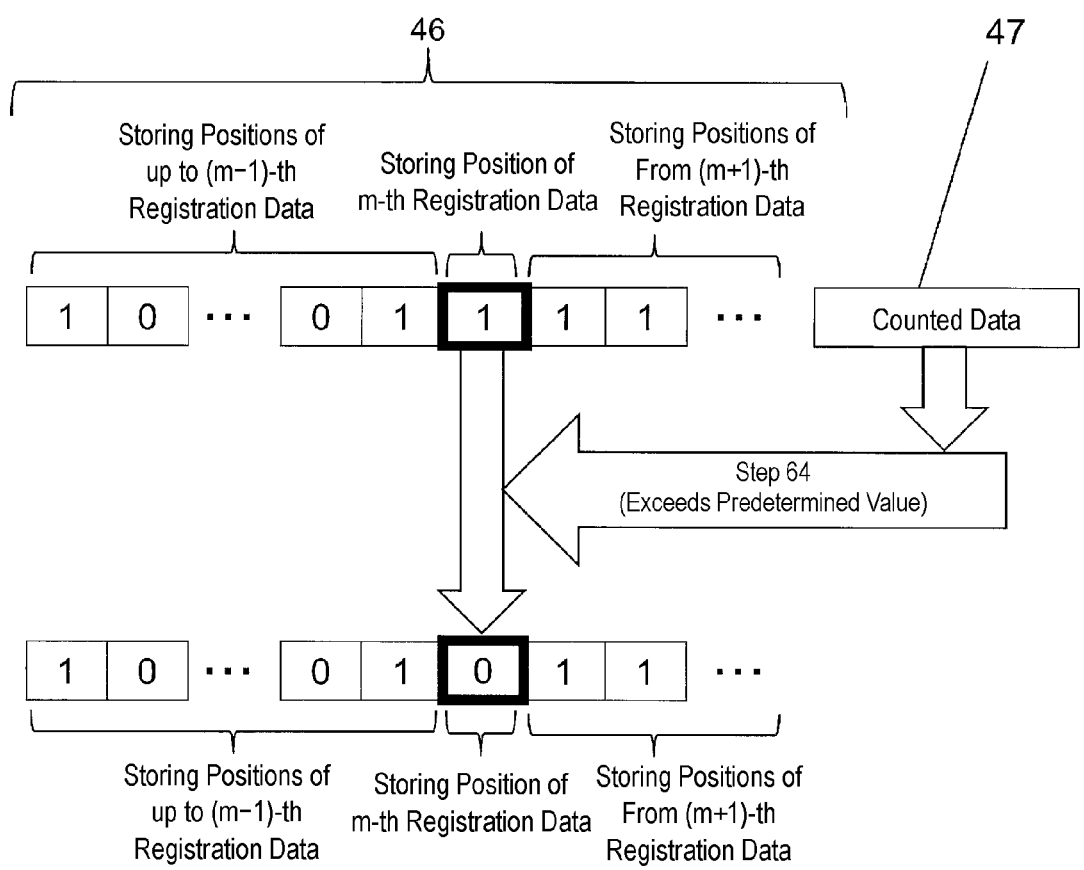
FIG. 23 is a diagram illustrating a flow for storing the registration data in the nonvolatile memory in the terminal device according to the second embodiment of the present invention.

The registration data determination processing in terminal device 200 will be described below with reference to FIGS. 21 to 23 as well as FIG. 17. FIG. 21 is a flowchart illustrating the flow for the registration data determination processing in the terminal device. FIG. 22 is a diagram illustrating the flow for storing the registration data in the nonvolatile memory in the terminal device. FIG. 23 is a diagram illustrating the flow for storing the registration data in the nonvolatile memory in the terminal device.

When terminal device 200 is activated, signal processing circuit 50, as described above, compares the output value from voltage detector 70 against the first threshold in Step 13. It is assumed that the output value from voltage detector 70 exceeds the first threshold at third time t3 and that, as is illustrated in FIG. 21, the processing by signal processing circuit 50 proceeds to Step 61.

In Step 61, signal processing circuit 50 reads the counted data from second area 47 of nonvolatile memory 44. After that, in Step 62, signal processing circuit 50 compares the counted data that is read against the predetermined value in accordance with the reference time described above. With the comparison against the predetermined value, for example, it is determined whether an act in accordance with the opening and closing of the window is equivalent to a long time or is equivalent to a short time.

In a case where the counted data that is read falls below the predetermined value, the processing by signal processing circuit 50 proceeds to Step 63, and the determination as the first data indicating that the counted data falls below the prescribe value (more precisely, indicating that the time interval is short) takes place in Step 63. In a case where the counted data that is read exceeds the predetermined value, the processing by signal processing circuit 50 proceeds to Step 64, and the determination as the second data indicating that the counted data exceeds the predetermined value (more precisely, indicating that the time interval is long) takes place in Step 64. The first data or the second data that is the registration data which is determined in Step 63 or 64 is stored in first area 46 of nonvolatile memory 44.

The processing order in which the registration data determination processing and the count data periodic-retention processing are performed, which are described above, is not limited. With the processing order, different pieces of counted data are used. Along with this, a flow for the storing of the first data or the second data in first area 46 of nonvolatile memory 44, and the like will be described with reference to FIGS. 22 and 23. FIGS. 22 and 23 illustrate a case where the registration data determination processing is performed before the count data periodic-retention processing.

As illustrated in FIGS. 22 and 23, first area 46 of nonvolatile memory 44 has plural storage positions storing which the registration data that is determined respective one of times terminal device 200 is activated. More precisely, the plural storage positions include storage positions for the first to (m−1)-th pieces of registration data that are determined while terminal device 200 is activated first to (m−1)-th times, respectively, the storage position for the m-th registration data that is determined while terminal device 200 is activated this time, that is, an m-th time, and the storage positions for the (m+1)-th and subsequent pieces of registration data that are determined while terminal device 200 is activated (m+1) time and subsequent times, respectively. In FIGS. 22 and 23, the first data is expressed as "1" and the second data is as "0".

In the case of terminal device 200 that performs the registration data determination processing before the count data periodic-retention processing, terminal device 200 reads, during the m-th activation, the (m−1)-th counted data that is retained in second area 47. The m-th registration data is determined based on the (m−1)-th counted data, and the m-th registration data is stored in the storage position in the first area 46 for the corresponding m-th registration data.

At a starting time point for the m-th activation of terminal device 200, as illustrated in the upper portion of FIG. 22 and in the upper portion of FIG. 23, the first to (m−1)-th pieces of registration data are stored in corresponding storage positions in first area 46, respectively. The first data is stored previously in the storage position for the m-th registration data and the storage positions for the (m+1)-th and subsequent pieces of registration data. A timing at which the first data is stored in the storage positions for the m-th and subsequent pieces of registration data may be set at least before Step 63 or 64.

The storage positions for the m-th and subsequent pieces of registration data within first area 46 may be storage positions for pieces of registration data in the past that were set not to be used as a result of the comparison against the pairing pattern that will be described later. In this case, similarly, the first data is also stored again previously in the storage position for the registration data in the past. Since the number of times that writing is performed on nonvolatile memory 44 is limited, in order to alleviate this, plural first areas 46 may be provided, and the first areas 46 are used alternately. The selection data to select is registered in nonvolatile memory 44. First area 46 to use may be set to be determined based on the selection data.

In terminal device 200 during the m-th activation, in a state of first area 46 that is illustrated in the upper portion of FIG. 22 and the upper portion of FIG. 23, signal processing circuit 50 reads the counted data from second area 47. In this case, since the count data periodic-retention processing in accordance with the m-th activation is not performed, the (m−1)-th counted data is read, and the (m−1)-th counted data is compared against the predetermined value in Step 62.

In a case where the (m−1)-th counted data falls below the predetermined value, signal processing circuit 50 determines the m-th registration data as the first data in Step 63. More precisely, as illustrated in the lower portion of FIG. 22, the storage position in first area 46 for the m-th registration data maintains a state where the first data remains stored previously in the storage position per se.

In a case where the counted data exceeds the predetermined value, the processing by signal processing circuit 50 proceeds to Step 64, the m-th registration data is determined as the second data, and, as illustrated in the lower portion of FIG. 23, the second data is stored over again in the storage position for the m-th registration data in first area 46.

The registration data determination processing is preferably performed before the count data periodic-retention processing described above, but the registration data determination processing may be performed after the count data periodic-retention processing. In this case, in the count data periodic-retention processing during the m-th activation, a state where m-th counted data is retained in second area 47 of nonvolatile memory 44 is attained. Because of this, the m-th counted data is compared against the predetermined value, and thus the m-th registration data is determined. In this case, for example, when the determination as the second data takes place, proceeding to a subroutine takes place, the transmission processing including the transmission processing of the second data is set to be performed.

The case where the first data is stored previously in the storage position for the m-th and subsequent pieces of registration data is described above, but the second data may be stored previously and processing corresponding to this may be performed.

In this manner, in terminal device 200, a length of the time during the activation is determined based on the count data and thus, a result of the determination is obtained. This operation does not require a time constant circuit, and selection of a resistor and a capacitor that is used for setting a time constant and the time constant circuit is unnecessary. Furthermore, terminal device 200 that performs only the software processing which uses counter 80 and thus is capable of providing various settings only by changing the software can be manufactured, hence improving productivity.

In terminal device 200, the counted data is periodically stored in second area 47 of nonvolatile memory 44. Even though (m−1)-th activation is ended, terminal device 200 reliably retains the (m−1)-th counted data and performs the determination during the m-th activation.

As described above, since the number of times that writing is performed on nonvolatile memory 44 is limited, two or more second area 47 in each of which the counted data is periodically retained are preferably provided, and second areas 47 are used alternately. The selection data to select is registered in nonvolatile memory 44. The second area to use may be determined based on the selection data.

In a case where the count data periodic-retention processing is performed after the registration data determination processing, when counter 80 starts to operate, control circuit 40 decreases the operation clock frequency based on comparison with the operation clock frequency that is used before counter 80 starts to operate, or decreases the lower limit voltage value after counter 80 starts to operate, and thus, can maintain the operating state of control circuit 40 for a long time with a limited amount of power from power generator 10.

(9. Transmission Processing in Terminal Device)

Figure 24:
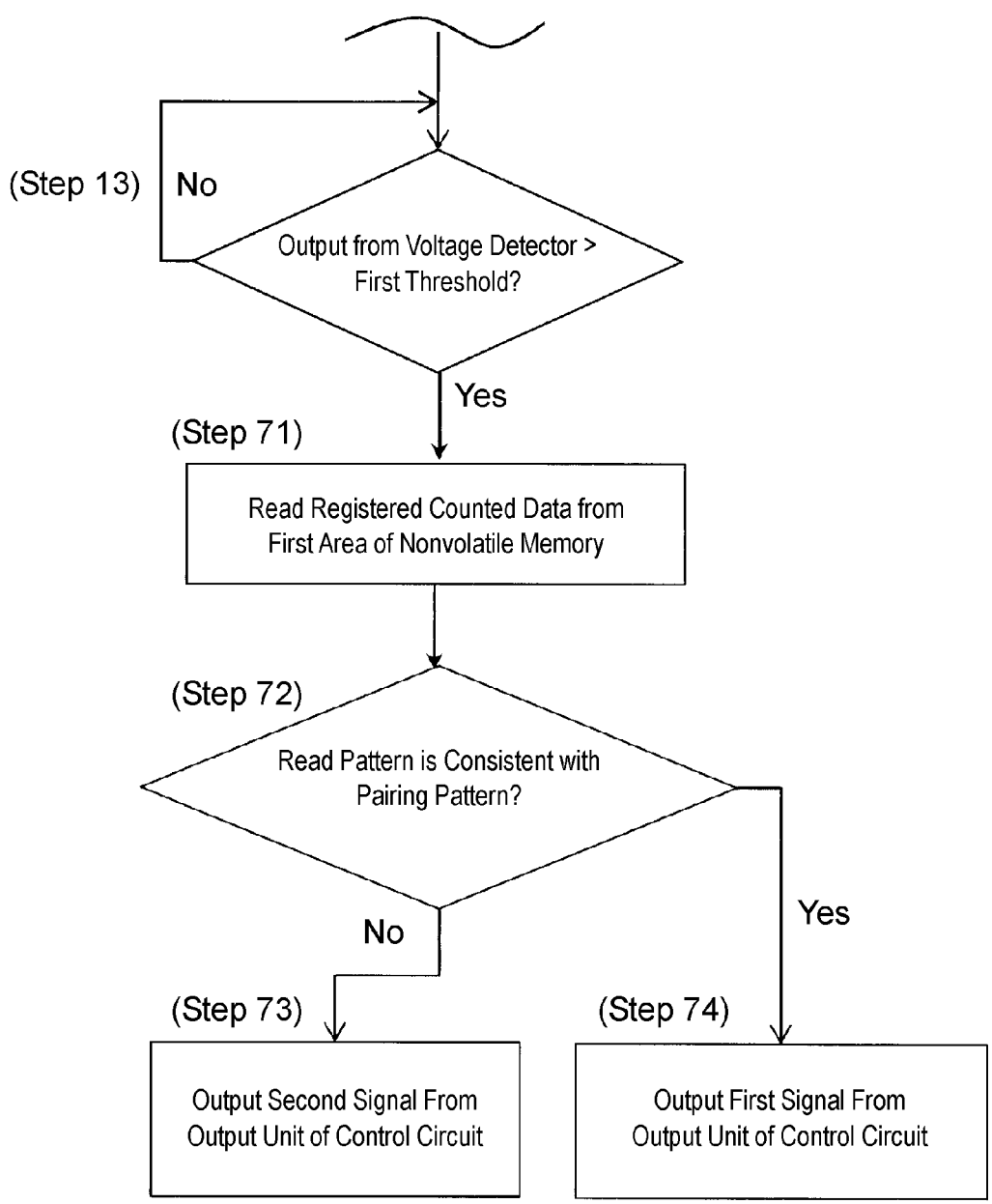
FIG. 24 is a flowchart illustrating a flow for an outline of transmission processing in the terminal device according to the second embodiment of the present invention.

The transmission processing in the terminal device will be described below with reference to FIG. 24 as well as FIG. 3. FIG. 24 is a flowchart illustrating a flow for an outline of the transmission processing in the terminal device.

In Step 5 shown in FIG. 3, with the n-th act, the operator activates terminal device 200. When the condition in Step 13 which is described above is satisfied, terminal device 200 proceeds to Step 71, and signal processing circuit 50, in Step 71, reads the registration data stored in nonvolatile memory 44 from first area 46. The reading range of the registration data will be described in the next section.

Subsequently, signal processing circuit 50 compares the reading pattern read in Step 72 against the predetermined pairing pattern. In the case where the reading pattern is not consistent with the pairing pattern, the processing by signal processing circuit 50 proceeds to Step 73, and signal processing circuit 50 generates the second signal from output unit 43, outputs the generated second signal, and transmits the generated second signal via wireless circuit 60 by radio.

In Step 72, in the case where the reading pattern is consistent with the pairing pattern, the processing by signal processing circuit 50 proceeds to Step 74, and signal processing circuit 50 generates the first signal that is the pairing mode signal from output unit 43, outputs the generated first signal, and transmits the generated first signal via wireless circuit 60 by radio.

(10-1. Reading Range of Registration Data in the Case where Transmission Processing is Performed Before Registration Data Determination Processing in Terminal Device)

Figure 25:
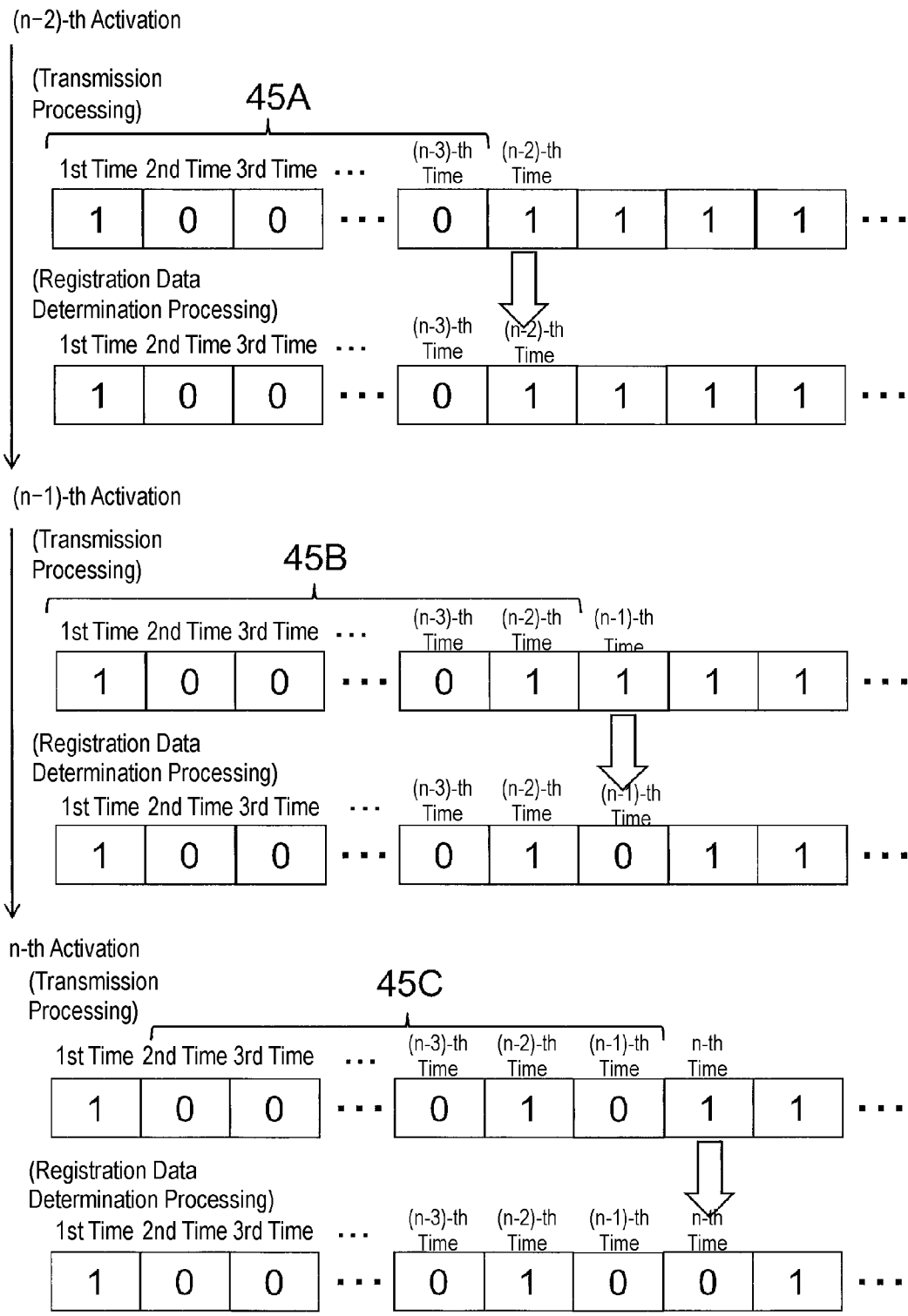
FIG. 25 is a diagram for describing a reading range of the registration data in the terminal device according to the second embodiment of the present invention.

Next, the range of the reading from first area 46 in the case where terminal device 200 performs the transmission processing before the registration data determination processing will be described with reference to FIG. 25. FIG. 25 is a diagram for describing the reading range of the registration data in the terminal device. In order to provide a description for easy understanding, it is assumed that the pairing pattern is a sequence of (n−2) number of patterns. The registration data is the first data or the second data, as described above.

As illustrated in the upper portion of FIG. 25, at a time point for the (n−2)-th activation of terminal device 200, the pieces of registration data from the first registration data that is determined during the first activation to the (n−3)-th registration data that is determined during the (n−3)-th activation are stored in corresponding storage positions in first area 46. The first data, as described above, is temporarily stored in storage positions in first area 46 for storing (n−2)-th and subsequent pieces of registration data, respectively.

In this state, terminal device 200 performs the (n−2)-th transmission processing. First, signal processing circuit 50 conducts a backward-in-time search of pieces of registration data in the past, starting from the latest registration data toward the past, and reads the pieces of registration data in first area 46. The maximum number of pieces of registration data is the same as the number of arranged pairing patterns. More precisely, in the (n−2)-th transmission processing, the storage positions for the (n−3)-th registration data, the (n−4)-th registration data, and so forth up to the second registration data and the first registration data are set as reading range 45A, and pieces of registration data are sequentially read from these storage positions. During the (n−2)-th activation, the number of pieces of registration data that are read is (n−3) that is smaller by 1 than the number of arranged pairing patterns. The reading pattern that is made up of the pieces of registration data which are read is compared against the pairing pattern. Since the number of reading patterns that are read at the time of the (n−2)-th activation is smaller than the number of pairing patterns, it is determined that there is a difference between the reading pattern and the pairing pattern, and signal processing circuit 50 determines the second signal (the normal mode signal), and transmits the generated second signal by radio. After that, the (n−2)-th registration data is stored in the (n−2)-th storage position in first area 46 during the (n−2)-th activation of terminal device 200. The (n−2)-th registration data is illustrated as being maintained as the first data as is.

Subsequently, in Step 4 shown in FIG. 3, when terminal device 200 is activated an (n−1)-th time, as illustrated in the middle portion of FIG. 25, the registration data is read from first area 46 as in the case of the (n−2)-th activation. Since the number of reading registration data is the same as the number of arranged pairing patterns, in the (n−1)-th transmission processing, the storage positions for the (n−2)-th registration data, the (n−3)-th registration data, and so forth up to the second registration data and the first registration data are set as reading range 45B. Then, the pieces of registration data are sequentially read from these storage positions. After that, the reading pattern is compared against the pairing pattern and a corresponding output signal is transmitted by radio. At this moment, it is assumed that it is determined that there is a difference between the reading pattern and the pairing pattern and thus that the second signal is set to be transmitted. After that, the (n−1)-th registration data is stored in the (n−1)-th storage position in first area 46 during the (n−1)-th activation of terminal device 200. It is illustrated that, as the (n−1)-th registration data, the second data is stored over again.

Subsequently, in Step 5 shown in FIG. 3, when terminal device 200 is activated at the n-th time, as illustrated in the lower portion of FIG. 25, storage positions for the (n−1)-th registration data, the (n−2)-th registration data, and so forth up to the third registration data and the second registration data, the number of which is the same as the number of arranged pairing patterns, are set as reading range 45C, and pieces of registration data are sequentially read from these storage positions. It is assumed that the reading pattern that is made up of the pieces of registration data that are read is compared against the pairing pattern and that it is determined that both are consistent with each other. In this case, signal processing circuit 50, during n-th activation of terminal device 200, makes a determination as the first signal (the pairing mode signal). The generated first signal is transmitted via antenna 61 by radio. Master wireless device 500 receives and determines the pairing mode signal. If a condition is satisfied, the pairing is completed. FIG. 25 illustrates that the registration data during the n-th activation is stored in the n-th storage position in first area 46, but the storing of the n-th registration data may not be performed according to the completion of the pairing. Furthermore, in the n-th reading, the first registration data may not be used. The storage position for the first registration data corresponds to the storage position for the registration data in the past, which is described above.

In the case where the transmission processing is performed before the registration data determination processing, the count data periodic-retention processing is preferably performed after the registration data determination processing. More precisely, the transmission processing that includes the wireless transmission is preferably performed before counter 80 operates.

The reading range for determining the pairing mode is not limited only to the setting described above. More precisely, a reference target may be determined previously within the storage position, and the determination of the pairing mode may be made based on registration data in a predetermined storage position which is set to be the reference target. For example, when one out of every two storage positions is set to be the reference target, the determination of the pairing mode may be made based on the registration data that is obtained only with the act of changing the window or the door from the opened state to the closed state, or only with the act of doing the reverse. In this case, two or more storage positions are preferably set to be reference targets.

(10-2. Reading Range of Registration Data in the Case where Transmission Processing is Performed after Registration Data Determination Processing in Terminal Device)

Figure 26:
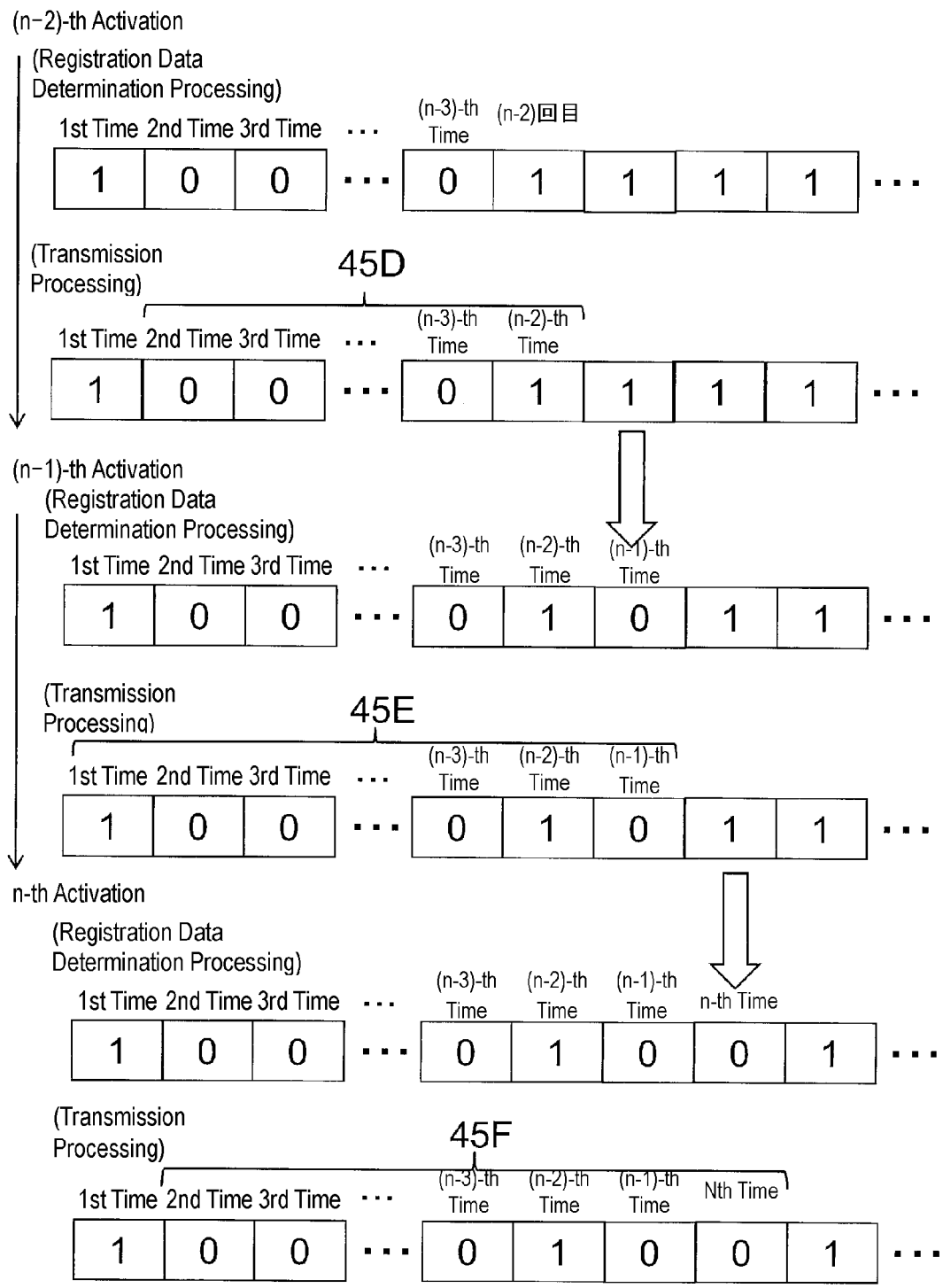
FIG. 26 is a diagram for describing the reading range of the registration data in the terminal device according to the second embodiment of the present invention.

Next, the range of the reading from first area 46 in the case where terminal device 200 performs the transmission processing after the registration data determination processing will be described with reference to FIG. 26. FIG. 26 is a diagram for describing the reading range of the registration data in the terminal device. To provide a description for easy understanding, it is assumed that the pairing pattern is a sequence of a (n−1) number of patterns. The registration data is the first data or the second data, as described above.

Terminal device 200 performs the (n−2)-th registration data determination processing, and then, performs the (n−2)-th transmission processing. More precisely, as illustrated in the upper portion of FIG. 26, the first registration data determined during the first activation to the (n−2)-th registration data determined during the (n−2)-th activation are stored in storage positions of first area 46, respectively, before the (n−2)-th transmission processing. As described above, the first data is temporarily stored in the (n−1)-th and subsequent storage positions in first area 46.

In this state, terminal device 200 performs the (n−2)-th transmission processing. First, signal processing circuit 50 conducts a backward-in-time search of pieces of registration data in the past starting from the latest registration data toward the past, and reads the pieces of registration data in first area 46. The maximum number of pieces of registration data that are read is the same as the number of arranged pairing patterns. More precisely, in the (n−2)-th transmission processing by terminal device 200, the storage positions for the (n−2)-th registration data, (n−3)-th registration data, and so forth up to the second registration data and the first registration data are set as reading range 45D. Pieces of registration data are sequentially read from these storage positions. In the (n−2)-th processing, since the number of pieces of registration data that are read is (n−2) that is smaller by 1 than the number of arranged pairing patterns, it is determined that, as a result of the comparison, the reading pattern that is made up of the pieces of registration data that are read is different from the pairing pattern, and signal processing circuit 50 transmits the second signal by radio.

Subsequently, in Step 4 shown in FIG. 3, when terminal device 200 is activated at an (n−1)-th time, the (n−1)-th registration data determination processing is performed before the (n−1)-th transmission processing, and as illustrated in in the middle portion of FIG. 26, the (n−1)-th registration data is stored in a corresponding storage position in first area 46. It is illustrated that, as the (n−1)-th registration data, the second data is set to be stored over again.

After that, terminal device 200 performs the (n−1)-th transmission processing. Signal processing circuit 50 conducts a backward-in-time search of pieces of registration data in the past starting from the latest registration data toward the past, and reads the pieces of registration data in first area 46. The maximum number of pieces of registration data that are read is the same as the number of arranged pairing patterns. At the time of the n-th transmission processing, the storage positions for the (n−1)-th registration data, the (n−2)-th registration data, and so forth up to the second registration and the first registration data are set as reading range 45E, and the pieces of registration data are sequentially read from these storage positions. After that, the reading pattern is compared against the pairing pattern and a corresponding output signal is transmitted by radio. At this moment, it is assumed that it is determined that there is a difference between the reading pattern and the pairing pattern and thus that the second signal is transmitted.

Subsequently, in Step 5 shown in FIG. 3, when terminal device 200 is activated at the n-th time, the n-th registration data determination processing is performed before the n-th transmission processing, and as illustrated in the lower portion in FIG. 26, the n-th registration data is stored in a corresponding storage position in first area 46. It is illustrated that, as the n-th registration data, the second data is stored over again.

After that, terminal device 200 performs the transmission processing at the time of the n-th activation. Signal processing circuit 50 conducts a backward-in-time search of pieces of registration data in the past starting from the latest registration data toward the past, and reads the pieces of registration data in first area 46. The maximum number of pieces of registration data that are read is the same as the number of arranged pairing patterns. At the time of the n-th transmission processing, the storage positions for the n-th registration data, the (n−1)-th registration data, and so forth up to the third registration and the second registration data are set as reading range 45F, and the pieces of registration data are sequentially read from these storage positions. After that, the reading pattern is compared against the pairing pattern. At this moment, it is assumed that a result of the determination is that the reading pattern is consistent with the pairing pattern. In this case, during the n-th activation, signal processing circuit 50 transmits the first signal (the pairing mode signal) by radio. Master wireless device 500 receives and determines the pairing mode signal. If a condition is satisfied, the pairing is completed. In the n-th transmission processing, the first registration data may not be used. The storage position for the first registration data corresponds to the storage position for the registration data in the past, which is described above.

In the case where the transmission processing is performed after the registration data determination processing, the count data periodic-retention processing is preferably performed after the registration data determination processing.

Similarly to the preceding section, the reading range for determining the pairing mode is not limited only to the setting described above. More precisely, a reference target may be determined previously within the storage position, and the determination of the pairing mode may be made based on registration data in a predetermined storage position which is set to be the reference target. For example, when one out of every two storage positions is set to be the reference target, the determination of the pairing mode may be made based on the registration data that is obtained only with the act of changing the window or the door from the opened state to the closed state, or only with the act of doing the reverse. In this case, two or more storage positions are preferably set to be reference targets. The above embodiments may be specified to the following items.

[Item 1]

A terminal device includes an activator, a power generator, an electric storage part, a voltage converter, a control circuit, a wireless circuit. The power generator generates electric charge in response to operation of the activator. The electric storage part stores the electric charge. The voltage converter converts a first voltage obtained from the electric storage part into a second voltage. The control circuit includes a first input unit, a second input unit, an output unit, a nonvolatile memory, and a signal processing circuit. The control unit is operable to start operating from a first time with the second voltage as a power source that is applied to the first input unit. The control unit is operable to stop operating at a second time at which the second voltage falls below a lower limit voltage value. The wireless circuit transmits an output signal from the output unit by radio. The terminal device further includes a voltage detector that outputs, to the second input unit, an output value in accordance with the first voltage. The control circuit further includes an oscillator that generates a clock and a timer that measures of a clock speed during operation of the control circuit. When an m-th activation starts, the nonvolatile memory stores first to (m−1)-th pieces of registration data that are obtained while the activator is activated first to (m−1)-th times, respectively. When the output value exceeds a predetermined first threshold at a third time after the first time during the m-th activation, the control circuit stores, in the nonvolatile memory by the second time, the m-th registration data determined during the m-th activation based on a measurement time measured by the timer, and outputs either a first signal or a second signal as the output signal from the output unit according to the first to (m−1)-th pieces of registration data or according to the first to (m−1)-th pieces of registration data and the m-th registration data.
[Item 2]

In the terminal device of item 1, the signal processing circuit is operable to cause the timer to start to measure time from the third time. The signal processing circuit is operable to, when the measured time exceeds a reference time between the third time and the second time, store the m-th registration data in the nonvolatile memory.
[Item 3]

In the terminal device of item 1, first data indicating that the measurement time does not exceed a reference time is previously stored in a storage position in which the m-th registration data is stored, in the nonvolatile memory. When the measured time exceeds the reference time, the signal processing circuit stores again second data indicating that the measured time exceeds the reference time, as the m-th registration data, in a storage position in which the m-th registration data is stored.
[Item 4]

In the terminal device of item 1, the nonvolatile memory further includes a retention position in a storage area, the retention position periodically retaining therein the m-th measurement time at the time of the m-th activation therein. During the m-th activation, the signal processing circuit is operable to periodically retain the measured time at the time of the m-th activation in a retention position. During the m-th activation, the signal processing circuit is operable to determine the m-th registration data based on a comparison between a predetermined value corresponding to a predetermined reference time and a value corresponding to the measured time at the time of (m−1)-th activation which is retained in the retention position at the time of (m−1)-th activation. During the m-th activation, the signal processing circuit is operable to store the determined m-th registration data in a storage position in which the m-th registration data is to be stored.
[Item 5]

In the terminal device of item, when the output value that exceeds the first threshold falls below the first threshold and resumes exceeding the first threshold at a fourth time, between the third time and the second time, the control circuit replaces the fourth time with the third time at the time of (m+1)-th activation.
[Item 6]

In the terminal device of item 1, when the timer operates after the output signal is output, the control circuit is operable to cause an operation clock frequency to be lower than a value of the operation clock frequency before the timer starts to operate, or to decrease the lower limit value after the timer starts to operate.
[Item 7]

In the terminal device of item 1, the nonvolatile memory includes a storage area storing therein the first to (m−1)-th pieces of registration data or storing therein the first to (m−1)-th pieces of registration data and the m-th registration data. The storage area is one of a plurality of storage areas. The signal processing circuit uses the plurality of storage areas alternately.
[Item 8]

In the terminal device of item 7, selection data is further registered in the nonvolatile memory. The signal processing circuit determines, based on the selection data, which one of the plurality of storage areas is used.
[Item 9]

In the terminal device of item 1, the power generator includes a power generation mechanism that is of an electromagnetic induction type or is of a piezoelectric generation type, which generates power according to operation of the activator.
[Item 10] (Two Values)

In the terminal device of item 1, the nonvolatile memory includes n number of storage units constituted by first to n-th storage units, where n is a positive integer and n≥3. The signal processing circuit is configured to cause the timer to start to measure time after the activation starts. The signal processing circuit is configured to store registration data which is in a p-th storage unit among the n storage units, in a (p−1)-th storage unit among the n storage units, where p is a positive integer and n≥p≥2. The signal processing circuit is configured to store first registration data in the n-th storage unit. The signal processing circuit is configured to when the time measured by the timer exceeds a predetermined value, register second registration data in the n-th storage unit. The signal processing circuit is configured to output either the first signal or the second signal, as the output signal, from the output unit, according to pieces of registration data which are stored in two or more storage units among a (n−1) number of storage units from the first storage unit to an (n−1)-th storage unit, the two or more storage units being previously determined as reference targets.
[Item 11] (Time Value)

In the terminal device of item 1, the nonvolatile memory includes an n number of storage units from a first storage unit to an n-th storage unit, where n≥3. The signal processing circuit is configured to cause the timer to measure time after the activation starts. The signal processing circuit is configured to store registration data which is in a p-th storage unit among the n storage units, in a (p−1)-th storage unit, where p is a positive integer and n≥p≥2. The signal processing circuit is configured to update registration data in the n-th storage unit one or more times according to the time measured by the timer. The signal processing circuit is configured to output either the first signal or the second signal, as the output signal, from the output unit, according to pieces of registration data which are stored in two or more storage units among (n−1) storage units from the first storage unit to an (n−1)-th storage unit that are previously determined as reference targets.
[Item 12] (Counter)

In the terminal device of any one of items 1 to 11, the timer is a counter that counts the clock, and the measured time is a value counted by the counter.
[Item 13]

A terminal device includes a control circuit which includes a first input unit, a second input unit, an output unit, a nonvolatile memory, a signal processing circuit, and a timer. In a method of controlling the terminal device, a second voltage as a power source voltage is applied to the first input unit from a first time by performing an m-th operation. The control circuit starts to operate by applying the power source voltage. The control circuit stops operating at a second time by causing the second voltage to fall below a lower limit voltage value. An output value of a voltage detector is input from the second input unit. The m-th registration data is determined according to a time measured by the timer after a third time at which the output value exceeds a first threshold that is predetermined. Either a first signal or a second signal as an output signal is output from the output unit according to first to (m−1)-th pieces of registration data or according to first to (m−1)-th pieces of registration data and m-th registration data which are stored in the nonvolatile memory.

[Item 14]

In the method of item 13, a power generator generates power. The power is stored in an electric storage part. A voltage converter converts a first voltage obtained from the electric storage part into the second voltage. The output value is generated according to the first voltage. The output signal output is transmitted from the output unit by radio.

[Item 15]

In the method of item 13, when the m-th registration data is determined, the m-th registration data is stored in the nonvolatile memory. Before determining the m-th registration data, or before storing the determined m-th registration data in the nonvolatile memory, the output signal is output.

[Item 16]

In the method of item 13, the first to (m−1)-th pieces of registration data are stored in the nonvolatile memory. When either the first signal or the second signal is generated, the first to (m−1)-th pieces of registration data are read from the nonvolatile memory.

[Item 17]

In the method of item 13, when the m-th registration data is determined, the m-th registration data is stored in the nonvolatile memory. Before generating either the first signal or the second signal, the first to (m−1)-th pieces of registration data and the m-th registration data are read from the nonvolatile memory.

[Item 18]

In the method of item 13, during the m-th activation, at the time of inputting the output value, when the output value that exceeds the first threshold falls below the first threshold and exceeds the first threshold at a fourth time again between the third time and the second time, the fourth time is replaced with the third time at the time of (m+1)-th activation.

[Item 19]

In the method of item 13, first data indicating that the measurement time does not exceed the reference time is previously stored in a storage position in the nonvolatile memory, the storage position storing the m-th registration data therein. When the measured time exceeds the reference time, second data is stored again as the m-th registration data in the storage position. The second data indicates that the measurement time exceeds the reference time.

[Item 20]

In the method of item 13, during m-th activation, a value in accordance with a time measured at the time of the m-th activation is periodically retained in a retention position set in a storage area of the nonvolatile memory. Before the value at the time of the m-th activation is periodically retained in the retention position, the m-th registration data is determined based on a comparison of an (m−1)-th value retained in the retention position and a predetermined value in accordance with a predetermined reference time.

[Item 21]

In the method of claim 20, after the m-th registration data is determined, the output signal is generated according to the first to (m−1)-th registration data and the m-th registration data.

[Item 22] (Two Values)

In the method of item 13, the nonvolatile memory includes n storage units from a first storage unit to an n-th storage unit, where n is a positive integer and n≥m. The timer starts to measure time after activation starts. Registration data which is in a p-th storage unit among the n storage units is stored in a (p−1)-th storage unit. First data is stored in an n-th storage unit. When a time measured by the timer exceeds a predetermined value, second data is registered in the n-th storage unit, where p is a positive integer and n≥p≥2. Either the first signal or the second signal is output as the output signal from the output unit according to pieces of registration data which are stored in two or more storage units among (n−1) storage units from the first storage unit to an (n−1)-th storage unit, the two or more storage units being previously determined as reference targets.

[Item 23] (Counted Value)

In the method of item 13, the nonvolatile memory includes n storage units from a first storage unit to an n-th storage unit, where n≥3. The timer starts measuring time after activation starts. Registration data which is in a p-th storage unit among the n storage units is stored in a (p−1)-th storage unit, where p is a positive integer and n≥p≥2. Registration data in the n-th storage unit is updated one or more times according to the time measured by the timer. Either the first signal or the second signal is output as the output signal from the output unit according to pieces of registration data which are stored in two or more storage units among (n−1) storage units from the first storage unit to an (n−1)-th storage unit, the two or more storage units being determined previously as reference targets.

[Item 24] (Counter)

In the method of any one of items 13 to 23, the timer is a counter that counts the clock, and the measured time is a value counted by the counter.

[Item 25]

A wireless communication system includes the terminal device of any one of items 1 to 12, and a master wireless device that receives a signal transmitted from the terminal device by radio. The first signal from the terminal device is a pairing mode signal through which the terminal device and the master wireless device are paired with each other.

INDUSTRIAL APPLICABILITY

In a terminal device according to the present invention, a method of controlling the terminal device, and a wireless communication system that uses the terminal device, either first or second signal is transmitted by radio without using a time constant circuit. Since various settings are possibly provided flexibly as a soft ware, the terminal device provides an effect of improving productivity as well, and is usefully used for various electronic apparatuses and the like that are used to perform wireless communication.

REFERENCE MARKS IN THE DRAWINGS

10 power generator
10A activator
20 electric storage part
30 voltage converter
40 control circuit 41 first input unit
42 second input unit
43 output unit
44 nonvolatile memory
45 storage area
45A, 45B, 45C, 45D, 45E, 45F reading range
50 signal processing circuit
60 wireless circuit
61 antenna
70 voltage detector
72 oscillator
80 timer (counter)
100 ram
200 terminal device
500 master wireless device
510 receiving circuit
511 antenna
520 control unit
521 nonvolatile memory
522 signal processing circuit
46 first area
47 second area

The invention claimed is:

1. A terminal device comprising:
an activator;
a power generator configured to generate electric charge in response to operation of the activator;
an electric storage part configured to store the electric charge;
a voltage converter configured to convert a first voltage obtained from the electric storage part into a second voltage;
a control circuit including a first input unit, a second input unit, an output unit, a nonvolatile memory, and a signal processing circuit, the control unit being configured to start operating from a first time with the second voltage as a power source which is applied to the first input unit, and stop operating at a second time at which the second voltage falls below a lower limit voltage value;
a wireless circuit configured to transmit an output signal from the output unit by radio; and
a voltage detector configured to output, to the second input unit, an output value in accordance with the first voltage,
wherein the control circuit further includes an oscillator configured to generate a clock and a timer configured to measure a clock speed during operation of the control circuit,
wherein, when an m-th activation starts, the nonvolatile memory stores first to (m−1)-th pieces of registration data which are obtained while the activator is activated first to (m−1)-th times, respectively, and
wherein, when the output value exceeds a predetermined first threshold at a third time after the first time during the m-th activation, the control circuit stores, in the nonvolatile memory by the second time, the m-th registration data determined during the m-th activation based on a measurement time measured by the timer, and outputs either a first signal or a second signal as the output signal from the output unit according to the first to (m−1)-th pieces of registration data or according to the first to (m−1)-th pieces of registration data and the m-th registration data.

2. The terminal device of claim 1, wherein the signal processing circuit is configured to:
cause the tinier to start to measure time from the third time; and
when the measured time exceeds a reference time between the third time and the second time, store the m-th registration data in the nonvolatile memory.

3. The terminal device of claim 1,
wherein first data indicating that the measurement time does not exceed a reference time is previously stored in a storage position in which the m-th registration data is stored, in the nonvolatile memory, and
wherein, when the measured time exceeds the reference time, the signal processing circuit stores again second data indicating that the measured time exceeds the reference time, as the m-th registration data, in a storage position in which the m-th registration data is stored.

4. The terminal device of claim 1,
wherein the nonvolatile memory further includes a retention position in a storage area, the retention position periodically retaining therein the m-th measurement time at the time of the m-th activation therein, and
wherein, during the m-th activation, the signal processing circuit is configured to:
periodically retain the measured time at the time of the m-th activation in a retention position;
determine the m-th registration data based on a comparison between a predetermined value corresponding to a predetermined reference time and a value corresponding to the measured time at the time of (m−1)-th activation which is retained in the retention position at the time of (m−1)-th activation; and
store the determined m-th registration data in a storage position in which the m-th registration data is to be stored.

5. The terminal device of claim 1, wherein, when the output value which exceeds the first threshold falls below the first threshold and resumes exceeding the first threshold at a fourth time, between the third time and the second time, the control circuit replaces the fourth time with the third time at the time of (m+1)-th activation.

6. The terminal device of claim 1, wherein, when the timer operates after the output signal is output, the control circuit is configured to:
cause an operation clock frequency to be lower than a value of the operation clock frequency before the timer starts to operate; or
decrease the lower limit value after the timer starts to operate.

7. The terminal device of claim 1,
wherein the nonvolatile memory includes a storage area storing therein the first to (m−1)-th pieces of registration data or storing therein the first to (m−1)-th pieces of registration data and the m-th registration data,
wherein the storage area is one of a plurality of storage areas, and
wherein the signal processing circuit uses the plurality of storage areas alternately.

8. The terminal device of claim 7,
wherein selection data is further registered in the non-volatile memory, and
wherein the signal processing circuit determines, based on the selection data, which one of the plurality of storage areas is used.

9. The terminal device of claim 1, wherein the power generator includes a power generation mechanism which is of an electromagnetic induction type or is of a piezoelectric generation type, which generates power according to operation of the activator.

10. The terminal device of claim 1,
wherein the nonvolatile memory includes n number of storage units constituted by first to n-th storage units, where n is a positive integer and m≥3,
wherein the signal processing circuit is configured to:
cause the timer to start to measure time after the activation starts;
store registration data which is in a p-th storage unit among the n storage units, in a (p−1)-th storage unit among the n storage units, where p is a positive integer and n≥p≥2;
store first registration data in the n-th storage unit;
when the time measured by the timer exceeds a predetermined value, register second registration data in the n-th storage unit; and
output either the first signal or the second signal, as the output signal, from the output unit, according to pieces of registration data which are stored in two or more storage units among a (n−1) number of storage units from the first storage unit to an (n−1)-th storage unit, the two or more storage units being previously determined as reference targets.

11. The terminal device of claim 1,
wherein the nonvolatile memory includes an n number of storage units from a first storage unit to an n-th storage unit, where n≥3,
wherein the signal processing circuit is configured to:
cause the timer to measure time after the activation starts;
store registration data which is in a p-th storage unit among the n storage units, in a (p−1)-th storage unit, where p is a positive integer and n≥p≥2;
update registration data in the n-th storage unit one or more times according to the time measured by the timer; and
output either the first signal or the second signal, as the output signal, from the output unit, according to pieces of registration data which are stored in two or more storage units among (n−1) storage units from the first storage unit to an (n−1)-th storage unit which are previously determined as reference targets.

12. The terminal device of claim 1, wherein the timer is a counter configured to count the clock, and the measured time is a value counted by the counter.

13. A method of controlling a terminal device, comprising:
providing a terminal device including a control circuit which includes a first input unit, a second input unit, an output unit, a nonvolatile memory, a signal processing circuit, and a timer:
applying a second voltage as a power source voltage to the first input unit from a first time by performing an m-th operation of the terminal device;
causing the control circuit to start to operate by applying the power source voltage;
causing the control circuit to stop operating at a second time by causing the second voltage to fall below a lower limit voltage value;
inputting an output value of a voltage detector from the second input unit;
determining the m-th registration data according to a time measured by the timer after a third time at which the output value exceeds a first threshold which is predetermined; and
outputting either a first signal or a second signal as an output signal from the output unit according to first to (m−1)-th pieces of registration data or according to first to (m−1)-th pieces of registration data and m-th registration data which are stored in the nonvolatile memory.

14. The method of claim 13, further comprising:
causing a power generator to generate power;
storing the power in an electric storage part;
causing a voltage converter to convert a first voltage obtained from the electric storage part into the second voltage;
generating the output value according to the first voltage; and
transmitting the output signal output from the output unit by radio.

15. The method of claim 13,
wherein, when determining the m-th registration data, the m-th registration data is stored in the nonvolatile memory, and
wherein, before determining the m-th registration data, or before storing the determined m-th registration data in the nonvolatile memory, the output signal is output.

16. The method of claim 13,
wherein the first to (m−1)-th pieces of registration data are stored in the nonvolatile memory, and
wherein, when either the first signal or the second signal is generated, the first to (m−1)-th pieces of registration data are read from the nonvolatile memory.

17. The method of claim 13,
wherein, when determining the m-th registration data, the m-th registration data is stored in the nonvolatile memory, and
wherein, before generating either the first signal or the second signal, the first to (m−1)-th pieces of registration data and the m-th registration data are read from the nonvolatile memory.

18. The method of claim 13, wherein during the m-th activation, at the time of inputting the output value, when the output value which exceeds the first threshold falls below the first threshold and exceeds the first threshold at a fourth time again between the third time and the second time, the fourth time is replaced with the third time at the time of (m+1)-th activation.

19. The method of claim 13,
wherein first data indicating that the measurement time does not exceed the reference time is previously stored in a storage position in the nonvolatile memory, the storage position storing the m-th registration data therein,
the method further comprises
when the measured time exceeds the reference time, storing again second data as the m-th registration data in the storage position, the second data indicating that the measurement time exceeds the reference time.

20. The method of claim 13, further comprising
during m-th activation, periodically retaining, in a retention position set in a storage area of the nonvolatile memory, a value in accordance with a time measured at the time of the m-th activation,
wherein, before the value at the time of the m-th activation is periodically retained in the retention position, the m-th registration data is determined based on a comparison of an (m−1)-th value retained in the retention position and a predetermined value in accordance with a predetermined reference time.

21. The method of claim 20, wherein after the m-th registration data is determined, the output signal is generated according to the first to (m−1)-th registration data and the m-th registration data.

22. The method of claim 13,
wherein the nonvolatile memory includes n storage units from a first storage unit to an n-th storage unit, where n is a positive integer and n≥m, and
wherein the method further comprises:
causing the timer to start to measure time after activation starts;
storing, in a (p−1)-th storage unit, registration data which is in a p-th storage unit among the n storage units;
storing first data in an n-th storage unit;
when a time measured by the timer exceeds a predetermined value, registering second data in the n-th storage unit, where p is a positive integer and n≥p≥2; and
outputting either the first signal or the second signal as the output signal from the output unit according to pieces of registration data which are stored in two or more storage units among (n−1) storage units from the first storage unit to an (n−1)-th storage unit, the two or more storage units being previously determined as reference targets.

23. The method of claim 13,
wherein the nonvolatile memory includes n storage units from a first storage unit to an n-th storage unit, where n≥3,
the method further comprising:
causing the timer to start measuring time after activation starts;
storing, in a (p−1)-th storage unit, registration data which is in a p-th storage unit among the n storage units, where p is a positive integer and n≥p≥2;
updating registration data in the n-th storage unit one or more times according to the time measured by the timer; and
outputting either the first signal or the second signal as the output signal from the output unit according to pieces of registration data which are stored in two or more storage units among (n−1) storage units from the first storage unit to an (n−1)-th storage unit, the two or more storage units being determined previously as reference targets.

24. The method of claim 13, wherein the timer is a counter configured to count the clock, and the measured time is a value counted by the counter.

25. A wireless communication system comprising:
the terminal device of claim 1; and
a master wireless device configured to receive a signal transmitted from the terminal device by radio,
wherein the first signal from the terminal device is a pairing mode signal through which the terminal device and the master wireless device are paired with each other.

* * * * *